United States Patent
Mei et al.

(10) Patent No.: US 8,804,005 B2
(45) Date of Patent: Aug. 12, 2014

(54) VIDEO CONCEPT DETECTION USING MULTI-LAYER MULTI-INSTANCE LEARNING

(75) Inventors: Tao Mei, Beijing (CN); Xian-Sheng Hua, Beijing (CN); Shipeng Li, Beijing (CN); Zhiwei Gu, Hefei (CN)

(73) Assignee: Microsoft Corporation, Redmond, WA (US)

( * ) Notice: Subject to any disclaimer, the term of this patent is extended or adjusted under 35 U.S.C. 154(b) by 1329 days.

(21) Appl. No.: 12/111,202

(22) Filed: Apr. 29, 2008

(65) Prior Publication Data

US 2009/0274434 A1    Nov. 5, 2009

(51) Int. Cl.
*G06K 9/62* (2006.01)
*G06K 9/34* (2006.01)

(52) U.S. Cl.
USPC .......................... 348/231.2; 382/173; 382/224

(58) Field of Classification Search
USPC ............................................................ 386/52
See application file for complete search history.

(56) References Cited

U.S. PATENT DOCUMENTS

| | | | |
|---|---|---|---|
| 6,442,538 | B1 | 8/2002 | Nojima |
| 6,988,245 | B2 | 1/2006 | Janevski |
| 7,010,751 | B2 | 3/2006 | Shneiderman |
| 7,296,231 | B2 | 11/2007 | Loui et al. |
| 7,783,106 | B2 * | 8/2010 | Cooper et al. ............... 382/173 |
| 2003/0177503 | A1 * | 9/2003 | Sull et al. ..................... 725/112 |
| 2007/0073749 | A1 | 3/2007 | Fan |
| 2007/0112583 | A1 | 5/2007 | Hua et al. |
| 2007/0255755 | A1 | 11/2007 | Zhang et al. |

FOREIGN PATENT DOCUMENTS

| | | |
|---|---|---|
| WO | 9946702 A1 | 9/1999 |
| WO | 2005072239 A3 | 8/2005 |

OTHER PUBLICATIONS

Iyengar, et al. "Discriminative Model Fusion for Semantic Concept Detection and Annotation in Video", Proceedings of the eleventh ACM international conference on Multimedia, Nov. 2-8, 2003, Berkeley, CA, USA, pp. 255-258.

Yang, et al., "Cross-Domain Video Concept Detection Using Adaptive SVMs", International Multimedia Conference. Proceedings of the 15th international conference on Multimedia, Sep. 23-28, 2007, Augsburg, Bavaria, Germany, pp. 188-197.

(Continued)

*Primary Examiner* — Behrooz Senfi
*Assistant Examiner* — Mohammed Jebari
(74) *Attorney, Agent, or Firm* — Carole Boelitz; Micky Minhas

(57) ABSTRACT

Visual concepts contained within a video clip are classified based upon a set of target concepts. The clip is segmented into shots and a multi-layer multi-instance (MLMI) structured metadata representation of each shot is constructed. A set of pre-generated trained models of the target concepts is validated using a set of training shots. An MLMI kernel is recursively generated which models the MLMI structured metadata representation of each shot by comparing prescribed pairs of shots. The MLMI kernel is subsequently utilized to generate a learned objective decision function which learns a classifier for determining if a particular shot (that is not in the set of training shots) contains instances of the target concepts. A regularization framework can also be utilized in conjunction with the MLMI kernel to generate modified learned objective decision functions. The regularization framework introduces explicit constraints which serve to maximize the precision of the classifier.

5 Claims, 7 Drawing Sheets

(56) References Cited

OTHER PUBLICATIONS

Wu, et al., "Ontology-Based Multi-Classification Learning for Video Concept Detection", IEEE International Confetence on Multimedia and Expo (ICME), 2004, pp. 1003-1006.

"TREC Video Retrieval Evaluation", http://www-nlpir.nist.gov/projects/trecvid.

Naphade, et al., "Large-scale Concept Ontology for Multimedia", IEEE Multimedia, vol. 13, No. 3, 2006, pp. 86-91.

Feng, et al., "Multiple Bernoulli Relevance Models for Image and Video Annotation", Proc.IEEE Conf. on Computer Vision and Pattern Recognition, 2004, pp. 1-8.

Ghosal, et al., "Hidden Markov Models for Automatic Annotation and Content-Based Retrieval of Images and Video", Proc. ACM Conf. on Research & Development on Information Retrieval, 2005, 8 pages.

Gu, et al., "MILC2: A Multi-Layer Multi-Instance Learning Approach to Video Concept Detection", Proc. of International Conference on Multi-Media Modeling, Kyoto, Japan, Jan. 2008, pp. 1-11.

Gu, et al., "Multi-Layer Multi-Instance Kernel for Video Concept Detection", Proc. ACM Int'l Conf. on Multimedia, Augsburg, Germany, Sep. 2007, pp. 349-352.

Tang, et al., "Structure-Sensitive Manifold Ranking for Video Concept Detection", Proc. ACM Multimedia, Augsburg, Germany, Sep. 23-29, 2007, 10 pages.

Dietterich, et al., "Solving the Multiple Instance Problem with Axis-Parallel Rectangles", Artificial Intelligence, vol. 89, Nos. 1-2, 1997, pp. 31-71.

Maron, et al., "Multiple-Instance Learning for Natural Scene Classification", Proc. 15th Int'l Conf. Machine Learning, 1998, pp. 341-349.

Gaertner, et al., "Multi-Instance Kernels", Proc. 19th Int'l Conf. Machine Learning, 2002, pp. 179-186.

Kwok, et al., "Marginalized Multi-Instance Kernels", *. Proc. 20th Int'l Joint Conf. on Artificial Intelligence, India. Jan. 2007, pp. 901-906.

Chen, et al., "Image Categorization by Learning and Reasoning with Regions", J. Machine Learning Research, vol. 5, 2004, pp. 913-939.

Naphade, et al., "A Generalized Multiple Instance Learning Algorithm for Large Scale Modeling of Multimedia Semantics", Proc. IEEE Int'l Conf. on Acoustics, Speech and Signal Processing, Philadelphia, PA, May 2005, pp. V-341 to V-344.

Gaertner, et al., "Kernels and Distances for Structured Data", Machine Learning, 2004, pp. 1-32.

Hofmann, et al., "A Review of Kernel Methods in Machine Learning", Dated: Tech. Rep. 156, Dec. 14, 2006, pp. 1-36.

Altun, et al., "Maximum Margin Semi-Supervised Learning for Structured Variables", Advances in Neural Information Processing Systems 18, MIT Press, Cambridge, MA, 2006, pp. 33-40.

Gaertner, "A Survey of Kernels for Structured Data", SIGKDD Explorations, 2003 pp. 49-58.

Collins, et al., "Convolution Kernels for Natural Language", Advances in Neural Information Processing Systems, vol. 14, MIT Press, 2002, pp. 1-8.

Kashima, et al., "Marginalized Kernels between Labeled Graphs", Proc. 20th Int'l Conf. on Machine Learning, 2003, 8 pages.

Haussler, "Convolution Kernels on Discrete Structures", UC Santa Cruz, Tech. Rep. UCSC-CRL-99-10, Jul. 1999, pp. 1-38.

Deng, et al., "Unsupervised Segmentation of Color-Texture Regions in Images and Video", IEEE Trans. Pattern Analysis and Machine Intelligence, vol. 23, No. 8, Aug. 2001, pp. 800-810.

Kishida, "Property of Average Precision and its Generalization: An Examination of Evaluation Indicator for Information Retrieval Experiments", Nii technical report (nii-2005-014e), NII, 2005, 20 pages.

Smola, et al., "Kernel Methods for Missing Variables", Proc 10th Int'l Workshop on Artificial Intelligence and Statistics. Barbados. 2005, pp. 1-8.

Cheung, et al., "A Regularization Framework for Multiple-Instance Learning", Proc. 23th Int'l Conf. on Machine Learning, Pittsburgh, USA, Jun. 2006, pp. 193-200.

Blum, et al., "Combining labeled and unlabeled data with co-training", Proc.Conf. on Computational Learning Theory, 1998, pp. 92-100.

Yan, et al., "Semi-supervised Cross Feature Learning for Semantic Concept Detection in Videos", Proc. IEEE Conf. on Computer Vision and Pattern Recognition, 2005, pp. 657-663.

Andrews, et al., "Support Vector Machines for Multiple-Instance Learning", Advances in Neural Information Processing Systems, 2003, pp. 561-568.

Chen, et al., "MILES; Multiple-instance learning via embedded instance selection", IEEE Trans. Pattern Analysis Machine Intelligence, vol. 28, issue 12, 2006, pp. 1931-1947.

Zhang, et al., "Automatic Partitioning of Full-motion Video", Multimedia Systems, vol. 1, No. 1, 1993, pp. 10-28.

* cited by examiner

VIDEO CONCEPT DETECTION USING MULTI-LAYER MULTI-INSTANCE LEARNING

BACKGROUND

Due to rapid advances in video capture technology, the cost of video capture devices has dropped greatly in recent years. As a result, video capture devices have surged in availability and popularity. Video capture functionality is now available to consumers on a mass market level in a variety of different forms such as mobile phones, digital cameras, digital camcorders, web cameras and the like. Additionally, laptop computers are also now available with integrated web cameras. As a result, the quantity of digital video data being captured has recently surged to an unprecedented level. Furthermore, corollary advances in data storage, compression and network communication technologies have made it cost effective for mass market consumers to store and communicate this video data to others. A wide variety of mass market software applications and other tools also now exist which provide consumers with the ability to view, manipulate and further share this video data for a variety of different purposes.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Video concept detection (VCD) technique embodiments described herein are generally applicable to classifying visual concepts contained within a video clip based upon a prescribed set of target concepts, each concept corresponding to a particular semantic idea of interest. These technique embodiments and the classification resulting therefrom can be used to increase the speed and effectiveness by which a video clip can be browsed and searched for particular concepts of interest. In one exemplary embodiment, a video clip is segmented into shots and a multi-layer multi-instance (MLMI) structured metadata representation of each shot is constructed. A set of pre-generated trained models of the target concepts is validated using a set of training shots. An MLMI kernel is recursively generated which models the MLMI structured metadata representation of each shot by comparing prescribed pairs of shots. The MLMI kernel can subsequently be utilized to generate a learned objective decision function which learns a classifier for determining if a particular shot (that is not in the set of training shots) contains instances of the target concepts. In other exemplary embodiments, a regularization framework can be utilized in conjunction with the MLMI kernel to generate modified learned objective decision functions. The regularization framework introduces explicit constraints which serve to maximize the precision of the classifier.

In addition to the just described benefits, other advantages of the VCD technique embodiments described herein will become apparent from the detailed description which follows hereafter when taken in conjunction with the drawing figures which accompany the detailed description.

DESCRIPTION OF THE DRAWINGS

The specific features, aspects, and advantages of the video concept detection technique embodiments described herein will become better understood with regard to the following description, appended claims, and accompanying drawings where:

DETAILED DESCRIPTION

Figure 1:
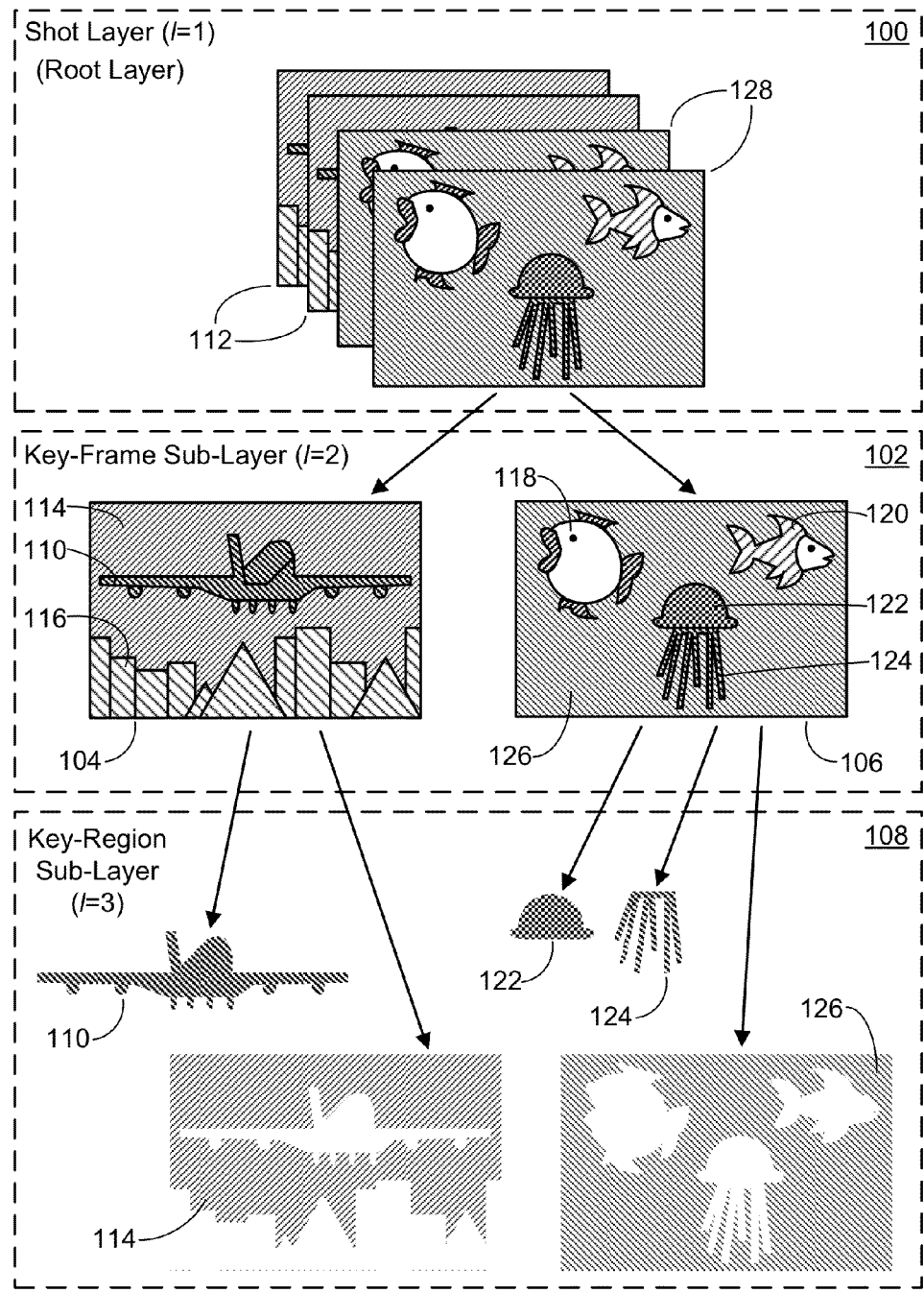
FIG. 1 illustrates a diagram of an exemplary embodiment, in simplified form, of a multi-layer multi-instance (MLMI) framework representation of a video clip.

In the following description of video concept detection technique embodiments reference is made to the accompanying drawings which form a part hereof, and in which are shown, by way of illustration, specific exemplary embodiments in which the VCD technique can be practiced. It is understood that other embodiments can be utilized and structural changes can be made without departing from the scope of the technique embodiments.

1.0 Introduction To VCD

As is appreciated by those of skill in the art of video/film digital processing, video annotation generally refers to a method for annotating a video clip with metadata that identifies one or more particular attributes of the clip. Video concept detection (VCD) is one possible method for performing video annotation based on a finite set of particular visual semantic concepts of interest (hereafter referred to simply as "target concepts"). Generally speaking, the VCD technique embodiments described herein classify the visual concepts contained within a video clip based upon a prescribed set of target concepts, and then generate structured metadata that efficiently describes the concepts contained within the clip at both the semantic and syntactic levels. These technique embodiments and the classification resulting therefrom are advantageous in that they can be used to increase the speed and effectiveness by which a video clip can be browsed and searched for target concepts. This is especially advantageous considering the aforementioned surge in the quantity of digital video data that is being captured, stored and communicated, and the large volume of data associated with a typical set of digital video data (herein referred to as a "video clip" or simply a "clip").

A fundamental step in performing the aforementioned classification of a video clip is to first understand the semantics of the data for the clip. This step can be characterized as a learning or modeling process. It is noted that a semantic gap generally exists between the high-level semantics of a particular video clip and the low-level features contained therein. The VCD technique embodiments described herein are employed as a way to narrow this semantic gap. As such, these VCD technique embodiments serve an important role in the aforementioned learning/modeling process, and therefore also serve an important role towards achieving an understanding of the semantics of a video clip. The aforementioned structured metadata generated from these VCD technique embodiments can be used as the basis for creating a new generation of mass market software applications, tools and systems for quickly and effectively browsing video clips, searching the clips for target concepts, manipulating the clips, and communicating the clips to others.

2.0 MLMI Framework

Generally speaking, a video clip, which can include a plurality of different scenes along with one or more moving objects within each scene, has distinctive structure characteristics compared to a single image of a single scene. More particularly, as will be described in detail hereafter, a clip intrinsically contains hierarchical multi-layer metadata structures and multi-instance data relationships. Accordingly, the VCD technique embodiments described herein are based on a structure-based paradigm for representing a clip as hierarchically structured metadata. As such, these technique embodiments are advantageous since they avail themselves to the hierarchical multi-layer metadata structures and multi-instance data relationships contained within a clip. More particularly, as noted heretofore and as will be described in more detail hereafter, these VCD technique embodiments generally involve classifying the visual concepts contained within a video clip and generating hierarchically structured metadata therefrom, where data relationships inside the clip are modeled using a hierarchical multi-layer multi-instance (MLMI) learning/modeling (hereafter also referred to simply as modeling) framework. As will be described in more detail hereafter, this MLMI framework employs a root layer and a hierarchy of sub-layers which are rooted to the root layer.

Before the VCD technique embodiments described herein are applied to a particular video clip, it is assumed that an MLMI structured metadata representation of the clip has been constructed as follows. First, it is assumed that a conventional method such as a pixel value change-based detection method has been used to perform shot boundary detection on the clip such that the clip is segmented into a plurality of shots, thus constructing what will hereafter be termed a "shot layer." Each shot (hereafter also referred to as a rooted tree or a shot T) contains a series of consecutive frames in the video that represent a distinctive coherent visual theme. As such, a video clip typically contains a plurality of different shots. Second, it is assumed that a conventional method such as a TRECVID (Text REtrieval Conference (TREC) Video Retrieval Evaluation) organizer has been used to extract one or more key-frames from each shot, thus constructing what will hereafter be termed a "key-frame sub-layer." Each key-frame contains one or more target concepts. Third, it is assumed that a conventional method such as a J-value Segmentation (JSEG) method has been used to segment each key-frame into a plurality of key-regions and subsequently filtering out those key-regions that are smaller than a prescribed size, thus constructing what will hereafter be termed a "key-region sub-layer." Finally, as will be described in more detail hereafter, it is assumed that a plurality of low-level feature descriptors have been prescribed to describe the visual concepts contained in the shot layer, key-frame sub-layer and key-region sub-layer, and that these various prescribed features have been extracted from the shot layer, key-frame sub-layer and key-region sub-layer. Exemplary low-level feature descriptors for these different layers will be provided hereafter.

Additionally, before the VCD technique embodiments described herein are applied to a particular video clip, it is also assumed that the following procedures have been performed. First, it is assumed that a conventional method such as a Large Scale Concept Ontology for Multimedia (LSCOM) method has been used to pre-define a set of prescribed target concepts. Second, it is assumed that a conventional method such as a Support Vector Machine (SVM) method has been used to pre-generate a set of statistical trained models of this set of target concepts. Third, it is assumed that the trained models are validated using a set of training shots selected from the aforementioned plurality of shots.

As will now be described in detail, each shot can generally be conceptually regarded as a "bag" which contains a plurality of paratactic "concept instances" (hereafter referred to simply as "instances"). More particularly, each key-frame can be conceptually regarded as a bag and each region contained therein can be regarded as an instance. Each key-frame can thus be conceptually regarded as a bag of region instances. Instance classification labels are applied to each key-frame bag as follows. A particular key-frame bag would be labeled as positive if at least one of the region instances within the bag falls within the target concepts; the key-frame bag would be labeled as negative if none of the region instances within the bag falls within the target concepts. As will become clear from the MLMI framework description which follows, this bag-instance correspondence can be further extended into the MLMI framework such that each shot can be conceptually regarded as a "hyper-bag" (herein also referred to as a "shot hyper-bag" for clarity) and each key-frame contained therein can also be regarded as an instance. In this case, instance classification labels are also applied to each shot hyper-bag as follows. A particular shot hyper-bag would be labeled as positive if one or more of the key-frame instances within the hyper-bag falls within the target concepts; the shot hyper-bag would be labeled as negative if none of the key-frame instances within the hyper-bag fall within the target concepts. Each shot can thus be conceptually regarded as a hyper-bag of key-frame instances. This hyper-bag, bag, instance and bag-instance terminology will be further clarified in the description which follows.

FIG. 1 illustrates a diagram of an exemplary embodiment, in simplified form, of an MLMI framework representation of a video clip. As depicted in FIG. 1, a video clip can be represented as a hierarchical three-layer structure. A layer indicator l denotes each particular layer, and each successive layer down the hierarchy describes the visual concepts contained in the clip in a higher degree of granularity compared to the description contained within the layer which precedes it in the hierarchy. As described heretofore, a video clip typically contains a plurality of different shots. The uppermost layer of the MLMI framework (i.e. the root layer) is termed a shot layer 100 which represents the shots 112/128 in the video clip. The shot layer 100 is denoted by l=1. The intermediate sub-layer contiguously beneath the shot layer 100 is termed a key-frame sub-layer 102 which represents the key-frames 104/106 in each shot 112/128, where as described heretofore, each key-frame contains one or more target concepts. More particularly, key-frame 104 is part of a first shot 112 in the clip in which an airplane 110 is taking off in the sky 114 over a city 116, where the airplane is a target concept. Key-frame 106 is part of a second shot 128 in the clip in which two fish 118/120 and a jellyfish 122/124 are swimming in water 126, where the jellyfish is a target concept. The key-frame sub-layer 102 is denoted by l=2. The lowermost sub-layer contiguously beneath the key-frame sub-layer 102 is termed a key-region sub-layer 108 which represents one or more key-regions 110/114/122/124/126 within each key-frame 104/106 that have been filtered as described heretofore, where each filtered key-region contains a particular target concept. More particularly, key-regions 110 and 114 represent the aforementioned airplane within key-frame 104, and key-regions 122, 124, and 126 represent the aforementioned jellyfish in key-frame 106. The key-region sub-layer 108 is denoted by l=3.

Referring again to FIG. 1, the bag-instance correspondences depicted therein will now be considered. Key-frames 104 and 106 can be conceptually regarded as bags, where each bag contains a plurality of region instances contained therein. If an airplane is considered to be a target concept, key-frame bag 104 would be labeled as positive since it contains two key-region instances 110 and 114 that fall within the target concept of an airplane; key-frame bag 106 would accordingly be labeled as negative since it contains no key region instances that fall within the target concept of an airplane. On the other hand, if a jellyfish is considered to be a target concept, key-frame bag 106 would be labeled as positive since it contains three key-region instances 122, 124 and 126 that fall within the target concept of a jellyfish; key-frame bag 104 would accordingly be labeled as negative since it contains no key-region instances that fall within the target concept of a jellyfish. From a higher layer perspective, shots 112/128 can be conceptually regarded as hyper-bags, where each hyper-bag contains key-frame instances contained therein. If an airplane is again considered to be a target concept, hyper-bag 112 would be labeled as positive since it contains a plurality of key-frame instances (e.g., 104) which fall within the target concept of an airplane; hyper-bag 128 would accordingly be labeled as negative since it contains no key-frame instances which fall within the target concept of an airplane. On the other hand, if a jellyfish is again considered to be a target concept, hyper-bag 128 would be labeled as positive since it contains a plurality of key-frame instances (e.g., 106) which fall within the target concept of a jellyfish; hyper-bag 112 would accordingly be labeled as negative since it contains no key-frame instances which fall within the target concept of a jellyfish.

To summarize, in the MLMI framework described herein, a video clip is represented as a hierarchical "set-based" structure with bag-instance correspondence. Each successive layer down the hierarchy describes the visual concepts contained in the clip in a higher degree of granularity compared to the description contained within the layer which precedes it in the hierarchy. As will be described in more detail hereafter, these visual concept descriptions employed in the different layers can also include different modalities. As described heretofore, various low-level feature descriptors can be prescribed to describe the visual concepts contained within the different layers. Referring again to FIG. 1, by way of example, low-level feature descriptors such as camera motion, object motion within a scene, text and the like can be extracted from the shot layer 100. By way of further example, low-level feature descriptors such as color histogram, color moment, texture and the like can be extracted from the key-frame sub-layer 102. By way of yet further example, low-level feature descriptors such as object shape, object size, object color and the like can be extracted from the key-region sub-layer 108. Furthermore, in the MLMI framework bag-instance correspondences exist both within each individual layer 100/102/108 as well as between contiguous layers in the hierarchy (i.e. between 100 and 102, and between 102 and 108). Additionally, in the MLMI framework a key-frame 104 and 106 can be conceptually regarded as both a bag of key-region instances 110/114 and 122/124/126, as well as an instance within a shot hyper-bag 112 and 128.

3.0 Introduction To Kernel-Based Modeling

This section provides a brief, general introduction to kernel-based modeling methods. In general, a kernel k which models metadata structures within an input space X can be simplistically given by the equation k: X×X ↦ R, where the input space X is mapped to either an n-dimensional vector $R^n$ or any other compound structure. For x,y ∈ X where x and y represent two different metadata structures within X, a kernel k(x,y) which models X, and compares x and y in order to determine a degree of similarity (or difference) between x and y, can be given by k(x,y)=<φ(x),φ(y)>, where φ is a mapping from the input space X to a high-dimensional (most likely infinite) space Φ embedded with an inner product. In a general sense, kernel k(x,y) can also be given by the following similarity measure:

$$d(\phi(x),\phi(y)) = \sqrt{k(x,x) - 2k(x,y) + k(y,y)}, \quad (1)$$

where d(φ(x),φ(y)) represents a distance function in mapping space Φ.

4.0 MLMI Kernel

Generally speaking, this section provides a description of an exemplary embodiment of an MLMI kernel which models the MLMI framework representation of a video clip described heretofore by comparing pairs of shots in a video clip. More particularly, referring again to FIG. 1, it will be appreciated that the MLMI kernel described hereafter facilitates performing VCD on a video clip by modeling the MLMI framework representation of a video clip by comparing prescribed pairs of shots 112 and 128 (hereafter referred to as shots T and T') within the clip in order to determine a degree of similarity (or difference) there-between. As will be appreciated in the description which follows, this MLMI kernel enables structured metadata to be contained within a linear separable space without requiring that an explicit feature mapping operation be performed. Additionally, it will be appreciated that this MLMI kernel fuses the rich context information from the different layers 100/102/108 in the hierarchy (i.e. for each layer, information describing its particular level in the overall hierarchy, information describing the low-level features contained therein, and information describing any sub-layer(s) that is linked thereto), thereby improving the efficiency and effectiveness of the kernel.

Referring again to FIG. 1, in the MLMI framework each shot 112/128 can generally be considered an L-layer rooted tree (hereafter also referred to as a shot T) containing a connected acyclic directed graph of nodes n, where each node n is connected via a unique path to a root node located in the shot/root layer 100. As will be described in more detail hereafter, both the key-frames 104/106 in the key-frame sub-layer 102 and the key-regions 110/114/122/124/126 in the key-region sub-layer 108 can be considered leaf nodes in the tree. Each node n represents structured metadata of a certain granularity, where the granularity of the metadata increases as you progress down through each sub-layer 102/108 in the hierarchy. The exemplary MLMI kernel embodiment described hereafter models this structured metadata by sufficiently enumerating all the sub-structures contained within each layer. L is the maximum length of the unique path from the root node to the leaf nodes in the lowest sub-layer of the tree (i.e. the key-region sub-layer 108); or in other words, L is the total number of layers in the hierarchy. Thus, in the exemplary MLMI framework depicted in FIG. 1 and as described herein, L=3. However, it is noted that another VCD technique embodiment is also possible in which L=2 and the MLMI framework simply includes the shot/root layer 100 and the key-frame sub-layer 102.

Given an L-layer tree corresponding to a particular shot T, the set of nodes n contained within T can be given by the equation:

$$N=\{n_i\}_{i=1}^{|N|}, \quad (2)$$

where |N| is the total number of nodes in T. If S is given to represent a tree set and $s_i$ is given to represent the set of node patterns whose parent node is $n_i$, $s_i$ can be given by the equation:

$$s_i=\{s|s \in S \wedge \text{parent}(s)=n_i\} \in \text{pow}(S), \quad (3)$$

where pow(S) refers to the power set of S. Additionally, a bijection mapping of $n_i \rightarrow s_i$ can be denoted. For each node $n_i \in N$, a "node pattern" of $n_i$ can be defined to be all the metadata associated with $n_i$, where this metadata is composed of the following three elements: layer information $l_i$, low-level feature descriptor information $f_i$, and tree sets $s_i$ rooted at $n_i$. $f_i$ more particularly represents a set of low-level features in the video clip based on a plurality of various modalities described heretofore. The node pattern of node $n_i$ can then be given by the following triplet form equation:

$$\hat{n}_i=<l_i,f_i,s_i> \quad (4)$$

T can thus be expanded to the following node pattern set:

$$\hat{N}=\{\hat{n}_i\}_{i=1}^{|N|}. \quad (5)$$

Figure 2A:
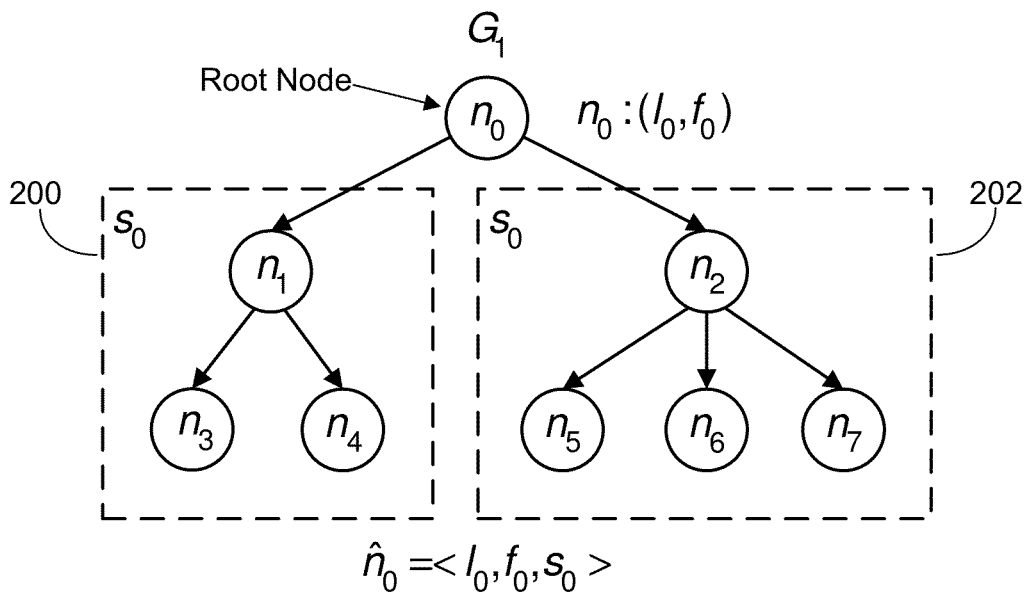
FIGS. 2A, 2B and 2C illustrate diagrams of an exemplary embodiment, in simplified form, of an expanded node pattern set and associated node pattern groups for the MLMI framework.
Figure 2B:
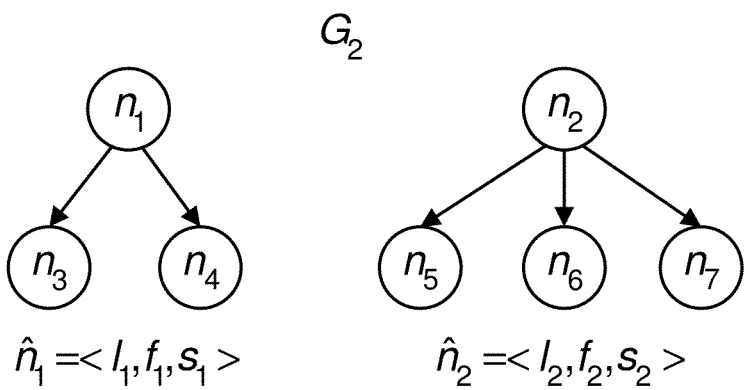
Figure 2C:
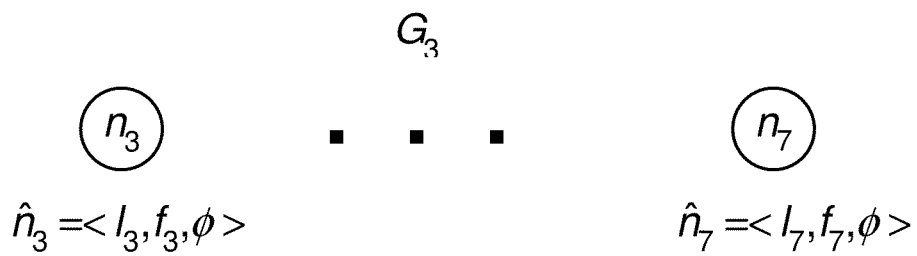

FIGS. 2A, 2B and 2C illustrate diagrams of an exemplary embodiment, in simplified form, of an expanded node pattern set $\hat{N}$ and associated node pattern groups $G_l$ for the MLMI framework depicted in FIG. 1. More particularly, referring again to FIG. 1, FIG. 2A illustrates a node pattern group $G_1$ for the root layer of the tree (i.e. the shot layer 100, herein also referred to as the uppermost layer l=1). $G_1$ contains the root node $n_0$ which can be given by the equation $n_0:(l_0,f_0)$, along with two exemplary tree sets $s_0$ 200/202 which are rooted at parent node $n_0$. According to equation (4), the node pattern of root node $n_0$ can be given by the equation $\hat{n}_0=<l_0,f_0,s_0>$. Nodes $n_1$ and $n_2$ correspond to key-frames 104 and 106 respectively. Nodes $n_3$, $n_4$, $n_5$, $n_6$ and $n_7$ correspond to key-regions 110, 114, 122, 124 and 126 respectively. FIG. 2B illustrates a node pattern group $G_2$ for the intermediate sub-layer of the tree (i.e. the key-frame sub-layer 102, herein also referred to as the intermediate layer l=2). $G_2$ contains the aforementioned nodes $n_1$-$n_7$ associated with the aforementioned two tree sets $s_0$. According to equation (4), the node pattern of node $n_1$ can be given by the equation $\hat{n}_1=<l_1,f_1,s_1>$, and the node pattern of node $n_2$ can be given by the equation $\hat{n}_2=<l_2,f_2,s_2>$. FIG. 2C illustrates a node pattern group $G_3$ for the lowest sub-layer of the tree (i.e. the key-region sub-layer 108, herein also referred to as the lowermost layer l=3). $G_3$ contains the aforementioned nodes $n_3$-$n_7$. Node $n_3$ can be given by the equation $\hat{n}_3=<l_3,f_3,\phi>$ and nodes $n_4$-$n_7$ can be given by similar equations (e.g., $\hat{n}_7=<l_7,f_7,\phi>$).

A kernel of trees (herein also referred to as shots T or T') can now be constructed using the expanded node pattern set given by equation (5). Based on the conventional definition of a convolution kernel, a relationship R can be constructed between an object and its parts. The kernel for the composite structured object can be defined based on the composition kernels of the parts of the object. First, $x,y \in X$ can be defined to be the objects and $\vec{x}, \vec{y} \in (X_1 \times \ldots \times X_D)$ can be defined to be tuples of parts of these objects, where D is the number of parts in each object. Given the relationship R: $(X_1 \times \ldots \times X_D) \times X$, x can then be decomposed as $R^{-1}(x)=\{\vec{x}: R(\vec{x},x)\}$.

Based on this decomposition, a convolution kernel $k_{conv}$ for comparing metadata structures x and y can be given by the following equation, with positive definite kernels on each part:

$$k_{conv}(x,y) = \sum_{\vec{x} \in R^{-1}(x), \vec{y} \in R^{-1}(y)} \prod_{d=1,\ldots,D} k_d(x_d, y_d). \quad (6)$$

For the node pattern set $\hat{N}$ defined in equation (5), R can be given by the set-membership equation $\bar{x} \in R^{-1}(X) \Leftrightarrow \vec{x} \in X$ where D=1. An MLMI kernel $k_{MLMI}$ for comparing two different shots T and T' in order to determine a degree of similarity (or difference) there-between can then be given by the equation:

$$k_{MLMI}(T,T') = \sum_{\hat{n} \in \hat{N}, \hat{n}' \in \hat{N}'} k_{\hat{N}}(\hat{n}, \hat{n}'), \quad (7)$$

where $\hat{n}$ is the node pattern of a particular node n in T and $\hat{n}'$ is the corresponding node pattern of corresponding particular node n' in T'. Since $\hat{n}$ and $\hat{n}'$ are each composed of three elements as given by triplet form equation (4), $k_{\hat{N}}$ is a kernel on this triplet space. Using the tensor product operation $(K_1 \otimes K_2((x,u),(y,v))=K_1(x,y)K_2(u,v))$, $k_{\hat{N}}$ can be given by the equation:

$$k_{\hat{N}}(\hat{n},\hat{n}')=k_\delta(l_n,l_n') \times k_f(f_n,f_n') \times k_{st}(s_n,s_n'). \quad (8)$$

Generally speaking, $k_\delta(x,y)=\delta_{x,y}$ is a matching kernel that represents the layer structure for metadata structures x and y. Thus, $k_\delta(l_n,l_n')$ in equation (8) is a matching kernel that represents the layer structure for $\hat{n}$ and $\hat{n}'$, since, as described heretofore, $l_n$ is the layer information for $\hat{n}$ and $l_n'$ is the layer information for $\hat{n}'$. $k_f$ is a feature-space kernel where $f_n$ is the low-level features in $\hat{n}$ and $f_n'$ is the low-level features in $\hat{n}'$. $k_{st}$ is a kernel of sub-trees where $s_n$ is the set of node patterns in T whose parent is n, and $s_n'$ is the set of node patterns in T' whose parent is n'. By embedding a multi-instance data relationship into $s_n$ and $s_n'$, $k_{st}$ can be given by the equation:

$$k_{st}(s_n,s_n')=\max_{\hat{c} \in s_n, \hat{c}' \in s_n'}\{k_{\hat{N}}(\hat{c},\hat{c}')\}, \quad (9)$$

which indicates that the similarity of two different node patterns is affected by the most similar pairs of their sub-structures. However, since the max function of equation (9) is non-differentiable, equation (9) can be approximated by choosing a conventional radial basis function (RBF) kernel for $k_f$ in equation (8). As a result, $k_f$ can be approximated by the equation:

$$k_f(f_n,f_n')=\exp(|f_n-f_n'|^2/2\sigma^2). \quad (10)$$

Using the definition of $k_f$ given by equation (10), equation (9) above can then be approximated by the equation:

$$k_{st}(s_n,s_n') = \sum_{\hat{c} \in s_n, \hat{c}' \in s_{n'}'} k_{\hat{N}}(\hat{c},\hat{c}'), \quad (11)$$

where $k_{st}$ is set to be 1 for leaf nodes (i.e. when $s_n,s_n'=0$).

Since the maximal layer of T is L, the nodes can be divided into L groups given by $\{G_l\}_{l=1}^L$. As a result, $\hat{N}$ can be transformed into a power set given by $\hat{N}=\{G_l\}_{l=1}^L$ where $G_l=\{\hat{n}_i|l_i=l\}$. Based upon the aforementioned matching kernel $k_\delta$, equation (7) can be rewritten as the equation:

$$k_{MLMI}(T, T') = \sum_{l=1}^{L} \sum_{\hat{n} \in G_l, \hat{n}' \in G'_l} k_{\hat{N}}(\hat{n}, \hat{n}'). \qquad (12)$$

$k_{MLMI}$ given by equation (12) can be shown to be positive definite as follows. As is appreciated in the art of kernel-based machine-learning, kernels are considered closed under basic operations such as sum ($K_1+K_2$), direct sum ($K_1 \oplus K_2$), product ($K_1 \times K_2$) and tensor product ($K_1 \otimes K_2$). Since $k_{MLMI}$ given by equation (12) is completely constructed of these basic operations (i.e. the direct sum in equations (7) and (10), and the tensor product in equation (8), it is closed and positive definite.

In order to avoid an undesirable scaling problem, a conventional feature-space normalization algorithm can then be applied to $k_{MLMI}$ given by equation (12). More particularly, $k_{MLMI}$ given by equation (12) can be normalized by the equation:

$$k_{MLMI}(T, T')_{NORM} = \frac{k_{MLMI}(T, T')}{\sqrt{k_{MLMI}(T, T)} \times \sqrt{k_{MLMI}(T', T')}}. \qquad (13)$$

From the MLMI kernel defined in equation (12), it is noted that the kernel $k_{MLMI}$ between two shots T and T' is the combination of kernels defined on node patterns of homogeneous layers, and these node pattern kernels are constructed based upon the intrinsic structure of the shots utilizing the rich context and multiple-instance relationships implicitly contained therein. Referring again to FIG. 1, it is further noted that this MLMI kernel is semi-positive definite when used to compare shots T and T' (herein also referred to as trees) or their related sub-trees on both the same and different layers (e.g., shot 100 to shot, shot to key-frame 102, shot to key-region 108, and key-frame to key-region). It is further noted that equation (13) results in a number that indicates the relative degree of similarity between T and T'; the smaller this number is the more similar T and T' are.

4.1 Generating MLMI Kernel

Figure 3:
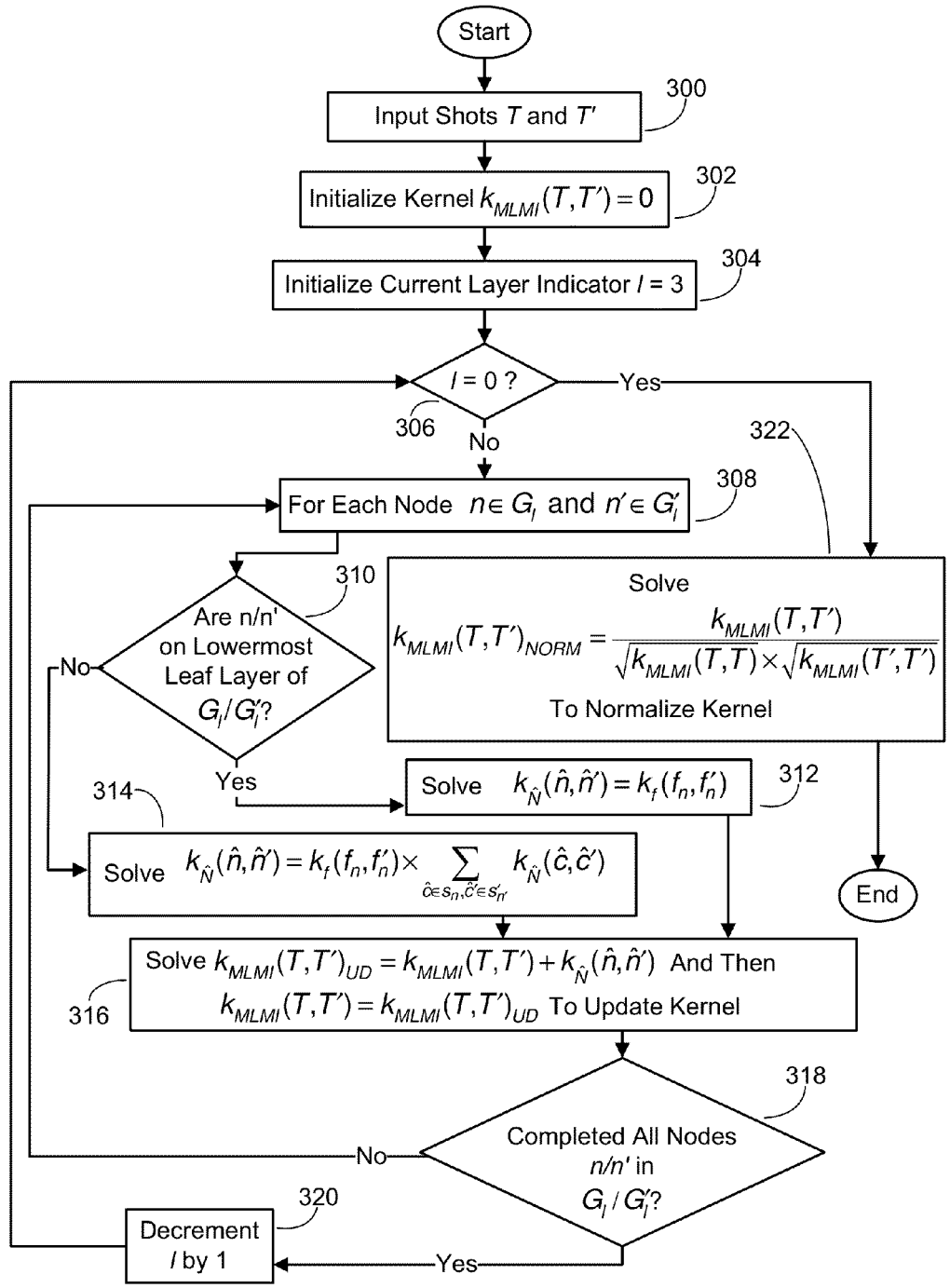
FIG. 3 illustrates an exemplary embodiment of a process for recursively generating an MLMI kernel which models the MLMI framework by comparing pairs of shots in a video clip.

FIG. 3 illustrates an exemplary embodiment of a process for recursively generating, in a bottom-up manner, the MLMI kernel $k_{MLMI}(T,T')$ described heretofore which models the MLMI framework representation of a video clip by comparing prescribed pairs of shots T and T' within the clip in order to determine a degree of similarity (or difference) there-between. The total number of layers for the MLMI framework used to represent the clip is assumed to be three (i.e. L=3). As depicted in FIG. 3, the process starts with inputting the two particular shots T and T' 300. $k_{MLMI}(T,T')$ is then initialized to zero 302. A layer indicator l is then initialized to l=3 304 (i.e. the lowermost key-region sub-layer). Then, a check is performed to determine if l=0 306? In this case, since l≠0 306 (i.e. currently l=3), for each node n ∈ $G_3$ and n' ∈ $G_3$', 308, if the nodes n and n' are not on the lowermost leaf layer of $G_3$ 310, a kernel $k_{\hat{N}}$ for the node pattern set $\hat{N}$ associated with nodes n and n' is generated by solving the equation $$k_{\hat{N}}(\hat{n}, \hat{n}') = k_f(f_n, f'_n) \times \sum_{\hat{c} \in s_n, \hat{c}' \in s'_{n'}} k_{\hat{N}}(\hat{c}, \hat{c}') 314.$$

If on the other hand the nodes n and n' are on the lowermost leaf layer of $G_3$ 310, a kernel $k_{\hat{N}}$ for the node pattern set $\hat{N}$ associated with nodes n and n' is generated by solving the equation $k_{\hat{N}}(\hat{n},\hat{n}')=k_f(f_n,f_n')$ 312. Then, $k_{MLMI}(T,T')$ is updated by solving the equations $k_{MLMI}(T,T')_{UD}=k_{MLMI}(T,T')+k_{\hat{N}}(\hat{n},\hat{n}')$, and then $k_{MLMI}(T,T')=k_{MLMI}(T,T')_{UD}$ 316.

Referring again to FIG. 3, once $k_{MLMI}(T,T')$ has been generated for all the nodes n and n' in $G_3$ and $G_3'$ 318, l is decremented by 1 320 such that l=2 (i.e. the intermediate key-frame sub-layer). Then, since l≠0 306 (i.e. currently l=2), for each node n ∈ $G_2$ and n' ∈ $G_2'$ 308, if the nodes n and n' are not on the lowermost leaf layer of $G_2$ 310, a kernel $k_{\hat{N}}$ for the node pattern set $\hat{N}$ associated with nodes n and n' is generated by solving the equation $$k_{\hat{N}}(\hat{n}, \hat{n}') = k_f(f_n, f'_n) \times \sum_{\hat{c} \in s_n, \hat{c}' \in s'_{n'}} k_{\hat{N}}(\hat{c}, \hat{c}') 314.$$

If on the other hand the nodes n and n' are on the lowermost leaf layer of $G_2$ 310, a kernel $k_{\hat{N}}$ for the node pattern set $\hat{N}$ associated with nodes n and n' is generated by solving the equation $k_{\hat{N}}(\hat{n}\hat{n}')=k_f(f_n,f_n')$ 312. Then, $k_{MLMI}(T,T')$ is updated by solving the equations $k_{MLMI}(T,T')_{UD}=k_{MLMI}(T,T')+k_{\hat{N}}(\hat{n},\hat{n}')$, and then $k_{MLMI}(T,T')=k_{MLMI}(T,T')_{UD}$ 316.

Referring again to FIG. 3, once $k_{MLMI}(T,T')$ has been generated for all the nodes n and n' in $G_2$ and $G_2'$ 318, l is again decremented by 1 320 such that l=1 (i.e. the uppermost shot layer). Then, since l≠0 306 (i.e. currently l=1), for each node n ∈ $G_1$ and n' ∈ $G_1'$ 308, if the nodes n and n' are not on the lowermost leaf layer of $G_1$ 310, a kernel $k_{\hat{N}}$ for the node pattern set $\hat{N}$ associated with nodes n and n' is generated by solving the equation $$k_{\hat{N}}(\hat{n}, \hat{n}') = k_f(f_n, f'_n) \times \sum_{\hat{c} \in s_n, \hat{c}' \in s'_{n'}} k_{\hat{N}}(\hat{c}, \hat{c}') 314.$$

If on the other hand the nodes n and n' are on the lowermost leaf layer of $G_1$ 310, a kernel $k_{\hat{N}}$ for the node pattern set $\hat{N}$ associated with nodes n and n' is generated by solving the equation $k_{\hat{N}}(\hat{n},\hat{n}')=k_f(f_n,f_n')$ 312. Then, $k_{MLMI}(T,T')$ is updated by solving the equations $k_{MLMI}(T,T')_{UD}=k_{MLMI}(T,T')+k_{\hat{N}}(\hat{n},\hat{n}')$, and then $k_{MLMI}(T,T')=k_{MLMI}(T,T')_{UD}$ 316.

Referring again to FIG. 3, once $k_{MLMI}(T,T')$ has been generated for all the nodes n and n' in $G_1$ and $G_1'$ 318, l is again decremented by 1 320 such that l=0 306. Then, $k_{MLMI}(T,T')$ can be normalized by solving equation (13) 322.

4.2 VCD Using SVM With MLMI Kernel (SVM-MLMIK Technique)

The exemplary MLMI kernel embodiment described heretofore can be combined with any appropriate supervised learning method such as the conventional Support Vector Machine (SVM) method in order to perform improved VCD on a video clip. This section provides a description of an exemplary embodiment of an SVM-MLMIK VCD technique which combines the aforementioned MLMI kernel with the SVM method. It is noted that the conventional SVM method can generally be considered a single-layer (SL) method. As such, the conventional SVM method is herein also referred to as the SVM-SL method.

Generally speaking, in the paradigm of structured learning/modeling, the goal is to learn an objective decision function f(x): X→Y from a structured input space X to response values in Y. Referring again to FIG. 1, in the exemplary MLMI framework embodiment described heretofore, determinate visual concepts are contained within the root layer (i.e. uppermost layer l=1 or shot layer 100), while the visual concepts and related low-level features contained within the sub-layers (i.e. intermediate layer l=2 (or key-frame sub-layer 102) and lowermost layer l=3 (or key-region sub-layer 108)) are unknown. As is appreciated in the art of kernel-based machine-learning, the SVM-SL method can be considered a maximum margin instance classifier in that it finds a separating hyper-plane that maximizes the separation (i.e. the margin) between positively labeled instances and negatively labeled instances.

Given J different training shots $x_i$ segmented from a structured input space X, and related instance classification labels $y_i$ for $x_i$ which are given by the equation $(x_1,y_1), \ldots, (x_J,y_J) \in X \times Y$, where $Y=\{-1,1\}$, once a structured metadata kernel model $k_x$ is determined for X, the learning/modeling process can then be transformed to an SVM-based process as follows. The dual form of the objective decision function in the SVM-SL method can be given by the equation:

$$\min_\alpha \left\{ \frac{1}{2} \alpha^T Q \alpha - 1^T \alpha \right\} \quad (14)$$
$$\text{s.t. } \alpha^T y = 0; 0 \le \alpha \le C,$$

where Q is a Gram matrix given by the equation $Q_{ij}=y_i y_j k_x(x_i,x_j)$, $k_x(x_i,x_j)$ is the kernel model, 1 is a vector of all ones, $\alpha \in R^J$ is a prescribed coefficient in the objective decision function, $y \in R^J$ is an instance classification label vector, and C is a prescribed constant which controls the tradeoff between classification errors and the maximum margin. Parameters $\alpha$ and C can be optimized using a conventional grid search method.

Based on equation (14), an SVM-SL-based learned objective decision function f(x) can be given by the equation:

$$f(x) = \text{sign}\left( \sum_{i=1,\ldots,J} y_i \alpha_i k_x(x_i, x) + b \right), \quad (15)$$

wherein b represents a bias coefficient. The learned objective decision function f(x) of equation (15) can then be improved by substituting the MLMI kernel of equation (12) for the kernel $k_x$, resulting in an SVM-MLMIK learned objective decision function f'(x) which can be given by the equation:

$$f'(x) = \text{sign}\left( \sum_{i=1,\ldots,J} y_i \alpha_i k_{MLMI}(x_i, x) + b \right). \quad (16)$$

In tested embodiments of the SVM-MLMIK technique σ and C were set as follows. σ was specified to vary from 1 to 15 with a step size of 2, and C was specified to be the set of values $\{2^{-2}, 2^{-1}, \ldots 2^5\}$.

4.3 VCD Process Using SVM-MLMIK Technique

Figure 5:
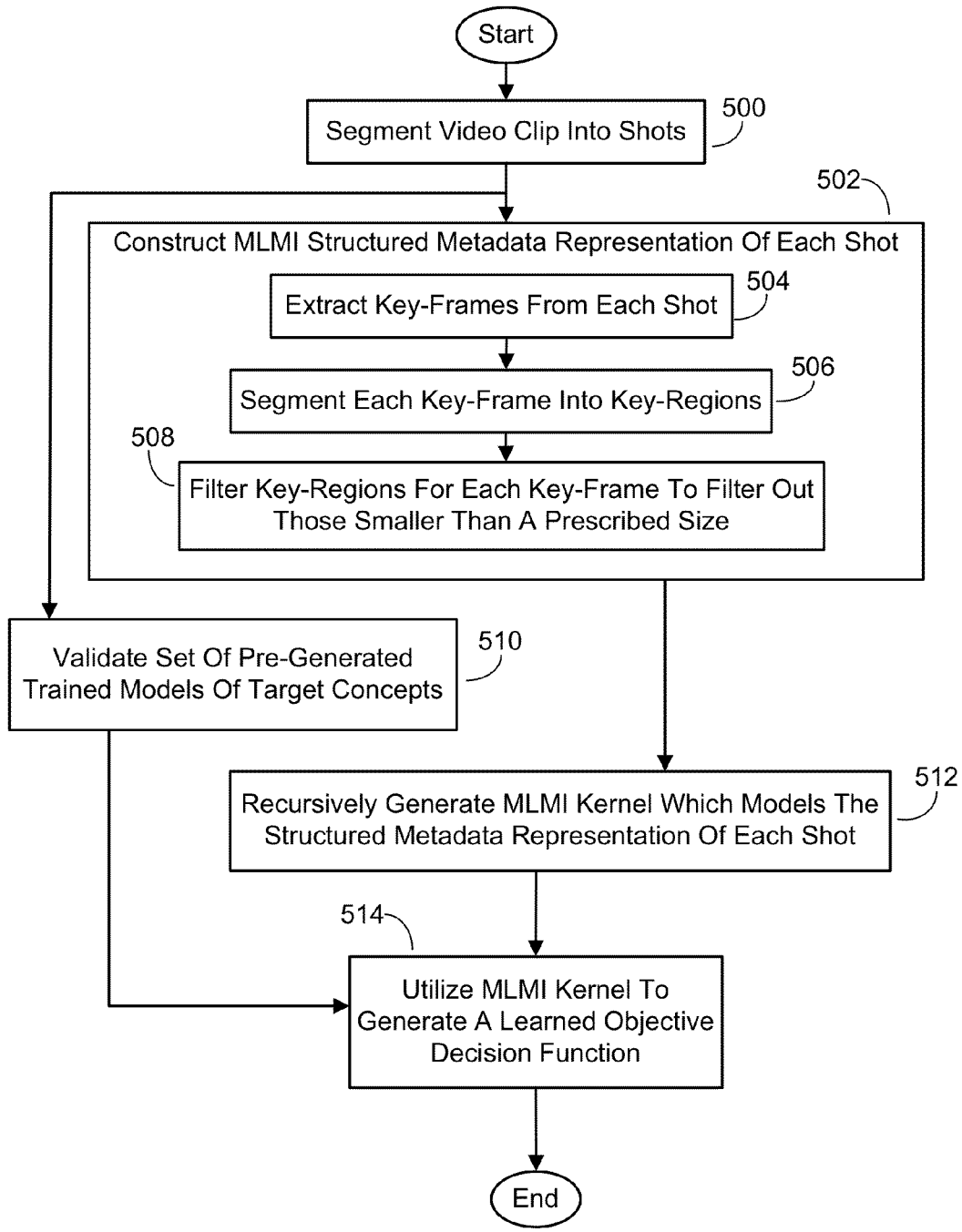
FIG. 5 illustrates an exemplary embodiment, in simplified form, of one process for classifying visual concepts contained within a video clip.

FIG. 5 illustrates an exemplary embodiment, in simplified form, of an SVM-MLMIK technique-based process for classifying visual concepts contained within a video clip (herein also termed performing VCD on the clip) based upon a prescribed set of target concepts. As depicted in FIG. 5, the process starts with segmenting the clip into a plurality of shots 500. An MLMI structured metadata representation of each shot is then constructed 502, where one or more key-frames are first extracted from each shot 504, followed by each key-frame being segmented into a plurality of key-regions 506, followed by the key-regions for each key-frame being filtered to filter out those that are smaller than a prescribed size 508. A set of pre-generated trained models of the target concepts is validated 510 using a set of training shots which are selected from the plurality of shots. An MLMI kernel is recursively generated 512, where this kernel models the MLMI structured metadata representation of each shot by comparing prescribed pairs of shots. The MLMI kernel is then utilized to generate a learned objective decision function 514 corresponding to the SVM-MLMIK technique, where this decision function learns a classifier for determining if a particular shot (that is not in the set of training shots) contains instances of the target concepts.

5.0 Regularization Framework

As is appreciated in the art of kernel-based machine-learning, not all instances in a positive bag should necessarily be labeled as positive. Accordingly, different instances in the same bag should ideally have different contributions to the kernel. In support of this ideal, this section provides a description of exemplary embodiments of a regularization framework for MLMI learning/modeling which introduces explicit constraints into the learned objective decision function described heretofore, where these constraints serve to restrict instance classification in the sub-layers of the MLMI framework.

As is appreciated in the art of kernel-based machine-learning, instance classification precision primarily depends on the kernel that is employed in the instance classification process. Referring again to FIG. 1, it is noted that in the MLMI framework and related MLMI kernel described heretofore, coherence of the metadata structures in the different layers 100/102/108 is maintained in a multi-instance manner which aids in the kernel's ability to deal with incorrectly labeled noisy data and more effectively model the metadata structures within the aforementioned hyper-plane. However, the MLMI kernel also possesses the following limitation. Since the MLMI kernel determines instance classification labels for the shot hyper-bags 112/128 without knowing the instance classification labeling for the key-frame and key-region sub-layers 102/108, the only knowledge the MLMI kernel has of this sub-layer labeling is that which is implicitly given by the multi-instance data relationships in the shot layer 100. Similarly, since the MLMI kernel determines instance classification labels for the key-frame bags 104/106 without knowing the instance classification labeling for the key-region sub-layer 108, the only knowledge the MLMI kernel has of this sub-layer labeling is that which is implicitly given by the multi-instance data relationships in the key-frame sub-layer 102. As a result, the MLMI kernel cannot completely explore the concept instances in the sub-layers and therefore can only determine "weak" instance classification labels for the target concepts within each layer 100/102/108. This limitation results in an ambiguity in the instance classification labels that are determined for the different layers. Since this instance classification label ambiguity propagates through the sub-layers 102 and 108 in the hierarchy, this phenomenon is termed an "ambiguity propagation" limitation. As will be appreciated from the detailed description of the regularization framework embodiments which follow, the regularization framework addresses the ambiguity propagation limitation of the MLMI kernel by directly modeling the multi-instance data relationships across each of the layers in the MLMI framework, thus reducing the propagation of instance classification label ambiguity through the sub-layers 102 and 108.

Figure 4:
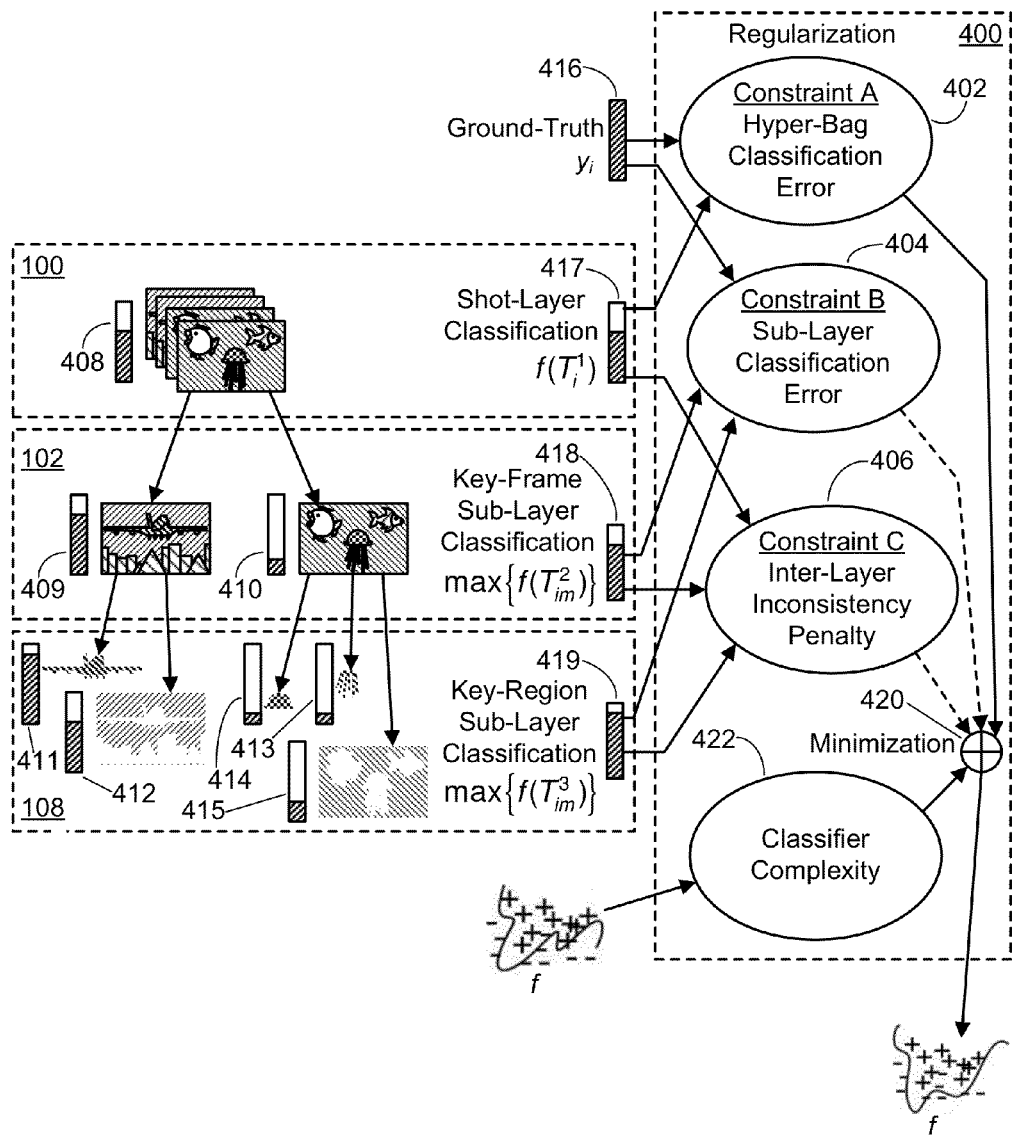
FIG. 4 illustrates a diagram of exemplary embodiments, in simplified form, of a regularization framework for MLMI learning/modeling which introduces explicit constraints into a learned objective decision function which serve to restrict instance classification in sub-layers of the MLMI framework.

FIG. 4 illustrates a diagram of exemplary embodiments, in simplified form, of the regularization framework. The left side of FIG. 4 depicts the exemplary MLMI framework representation of a video clip previously depicted in FIG. 1. As depicted in FIG. 4, and referring again to FIGS. 1 and 2A-2C, the regularization framework 400 introduces explicit constraints 402/404/406 into the learned objective decision function which serve to restrict instance classification in the sub-layers 102/108 of the MLMI framework. The gauge 408-415 to the left of each image in the MLMI framework represents the instance classification of the particular node that corresponds to the image (e.g., gauge 404 represents the instance classification of node $n_1$ that corresponds to key-frame image 104). A completely full gauge to the left of a particular image would represent a positive instance classification label for its corresponding node (i.e. a 100 percent match to the target concepts), and a completely empty gauge to the left of a particular image would represent a negative instance classification label for its corresponding node (i.e. a zero percent match to the target concepts). Gauge 416 represents a ground-truth for the target concepts and accordingly, this gauge is completely full. In the example provided in FIG. 4 the target concepts include an airplane. Thus, gauge 408 represents the shot layer 100 instance classification of node $n_0$ to the target concept of an airplane. Gauges 409 and 410 represent the key-frame sub-layer 102 instance classifications of nodes $n_1$ and $n_2$ respectively to this target concept. Gauges 411-415 represent the key-region sub-layer 108 instance classifications of nodes $n_3$-$n_7$ respectively to this target concept. Gauge 417 represents the shot layer instance classification to this target concept. Gauge 418 represents the key-frame sub-layer instance classification to this target concept. Gauge 419 represents the key-region sub-layer instance classification to this target concept.

Referring again to FIG. 4, the regularization framework 400 generally introduces the following explicit constraints to the final stage minimization procedure 420, an example of which is given by equation (14), associated with the learned objective decision function. Constraint A 402 takes into consideration the ground-truth 416 for the target concepts and the instance classification labels for the shots in the shot layer 417. Constraint A serves to minimize the shot (heretofore also referred to as the tree or shot T) instance classification errors, thus maximizing the precision of the classifier on the shots. Constraint B 404 takes into consideration the ground-truth 416, the instance classification labels for the key-frames in the key-frame sub-layer 418 and the instance classification labels for the sets of filtered key-regions in the key-region sub-layer 419. Constraint B serves to minimize the key-frame sub-layer and key-region sub-layer instance classification errors, thus maximizing the precision of the classifier on the sub-layers compared to the ground-truth 416. Constraint C 406 takes into consideration the instance classification labels for the shots in the shot layer 417, the instance classification labels for the key-frames in the key-frame sub-layer 418 and the instance classification labels for the sets of filtered key-regions in the key-region sub-layer 419. Constraint C serves to minimize the inter-layer inconsistency penalty, which measures the consistency between the key-frame sub-layer instance classification labels, the key-region sub-layer instance classification labels, and the shot layer instance classification labels. Based on the multiple-instance relationships in the MLMI framework, the maximum of the sub-layer instance classification labels should be consistent with the shot layer instance classification labels. As will be described in more detail hereafter, the regularization framework 400 also serves to minimize the overall complexity of the classifier 422.

Given a structured metadata set $\{(T_i,y_i)\}_{i=1}^{N^1}$ where $T_i \in \mathcal{T}$ is an L-layer rooted tree of training shots $T_i$, $y_i \in R$ is the instance classification label for $T_i$, and $N^1$ is the number of training shots that are employed. Generally speaking, the objective is to learn a function $f(T): \mathcal{T} \mapsto R$ from structured input space $\mathcal{T}$ to response values in R. Without loss of generality, the overall set of nodes $\mathcal{T}$ in the training set can be re-indexed sequentially, from the uppermost layer (i.e. the root layer) to the lowermost sub-layer, into the relationship equation:

$$\mathcal{T} : \left\{ T_1, \ldots, T_{N^1}, T_{11}^2, \ldots, T_{N^1 N_{N^1}^1}^2, \ldots, T_{11}^L, \ldots, T_{N^1 N_{N^1}^L}^L \right\}, \quad (17)$$

where $T_{im}^l$ is the $m^{th}$ sub-structure in the $l^{th}$ layer for shot $T_i$, and $N_{i,l}$ is the number of sub-structures in the $l^{th}$ layer for shot $T_i$.

If H is given to be the Reproducing Kernel Hilbert Space (RKHS) of function f(T), and $\|f\|_H^2$ is given to be the RKHS norm of function f, the mathematical optimization problem in MLMI learning/modeling can be given by the equation:

$$\min_{f \in H} \frac{1}{2}\|f\|_H^2 + \sum_{i=1}^{N^1} V(y_i, f(T_i), \{f(T_{im}^l)\}_{m,l} \mid m=1, \ldots, N_i^l; l=2, \ldots, L). \quad (18)$$

Referring again to FIG. 4, the first term in equation (18) is a regularization term which measures the complexity of the classifier 422, and the second term in equation (18) refers to the aforementioned constraints A 402, B 404 and C 406 that must be met by the learned function f. More particularly, constraint A 402 is a conventional Hinge loss function given by $V_1(y_i, f(T_i^1))$ which measures the disagreement between the instance classification labels $y_i$ for the ground-truth 416 and the root layer 100 (i.e. shot layer) classification $f(T_i^1)$ of the shots 417. Constraint B 404 is a Hinge loss function given by $\tilde{V}_i(y_i, \{f(T_{im}^l)\}_m)$ which measures the disagreement between the instance classification labels $y_i$ for the ground-truth 416, the key-frame sub-layer 102 classification $\{f(T_{im}^2)\}_m$ of the shots 418, and the key-region sub-layer 108 classification $\{f(T_{im}^3)\}_m$ of the shots 419. Constraint C 406 is an inter-layer inconsistency loss function given by $V_f(f(T_i^1), \{f(T_m^l)\}_m)$ which measures the disagreement between the shot layer 100 classification $f(T_i^1)$ of the shots 417, the key-frame sub-layer 102 classification $\{f(T_{im}^2)\}_m$ of the shots 418, and the key-region sub-layer 108 classification $\{f(T_{im}^3)\}_m$ of the shots 419.

The regularization framework described heretofore can be combined with the MLMI framework and related MLMI kernel described heretofore, resulting in an improved MLMI kernel which models the MLMI framework and the multi-instance data relationships that are contained therein in a more straightforward manner. As such, the regularization framework can be combined with the SVM-MLMIK technique described heretofore in order to maximize the instance classification precision when performing VCD on a video clip compared to the instance classification precision produced by SVM-MLMIK technique without this regularization framework. It is noted that various different embodiments of the regularization framework are possible, where the different embodiments employ different combinations of constraints A, B and C and different loss functions for V. It is also noted that among these three constraints, constraint A is considered the most important since it is focused on classifying the shots. Constraints B and C are considered comparatively less important than constraint A since they are focused on restricting the instance classification function. Thus, constraint A is employed in all of the different embodiments of the regularization framework that will be described hereafter. It is also noted that the SVM-MLMIK technique described heretofore also employs constraint A. However, the SVM-MLMIK technique does not take advantage of constraints B and C. Three different particular embodiments of the regularization framework will now be described, one which employs constraints A and B, another which employs constraints A and C, and yet another which employs constraints A, B and C.

5.1 VCD Using SVM-MLMIK Technique With Regularization Framework Employing Constraints A and B (MLMI-FLCE Technique)

This section provides a description of an exemplary embodiment of a VCD technique which combines the SVM-MLMIK technique described heretofore with an embodiment of the regularization framework described heretofore that employs the combination of constraint A (which serves to minimize the shot layer instance classification errors) and constraint B (which serves to minimize the key-frame sub-layer and key-region sub-layer instance classification errors). This particular embodiment of the regularization framework employing constraints A and B is hereafter referred to as the full layers classification error (FLCE) approach, and this corresponding particular embodiment of the VCD technique is hereafter referred to as the MLMI-FLCE technique.

Referring again to FIG. 4, in the MLMI structured metadata framework described heretofore, the instance classification labels for each layer 100/102/104 should be consistent with the ground-truth 416. The combination of constraints A 402 and B 404 in the regularization framework 400 serves to penalize the instance classification errors over all the L layers 100/102/104 in the MLMI framework. In this particular embodiment, the loss function for each shot can be given by the equation:

$$V(y_i, f(T_i), \{f(T_{im}^l)\}_{m,l}) = \lambda_1 V_1(y_i, f(T_i)) + \sum_{l=2}^{L} \lambda_l \tilde{V}_l(y_i, \{f(T_{im}^l)\}_m). \quad (19)$$

As in the conventional SVM-SL method described heretofore, a conventional Hinge Loss function can be used to represent the shot layer classification errors by the equation $V_1(y_i, f(T_i)) = \max(0, 1 - y_i f(T_i))$. The classification errors for the sub-layers can be given by the equation:

$$\tilde{V}_l(y_i, \{f(T_{im}^l)\}_m) = \tilde{E}(y_i, \max_m \{f(T_{im}^l)\}), \quad (20)$$

where the max function is adopted to reflect the multi-instance data relationships in the MLMI framework. $\lambda_1$ and $\lambda_j$ in equation (19) are prescribed regularization constants which determine a tradeoff between the shot layer classification errors and the key-frame and key-region sub-layer classification errors. $\tilde{E}{\bullet, \bullet}$ in equation (20) can be defined in a variety of different ways. If a weak restriction is used that penalizes only if a particular instance classification label and the ground-truth are inconsistent by sign, $\tilde{E}{\bullet, \bullet}$ in equation (20) can be given by the equation:

$$\tilde{E}(y_i, \max_m \{f(T_{im}^l)\}) = \max(0, -y_i \times \max_m \{f(T_{im}^l)\}). \quad (21)$$

Finally, the learned objective decision function for the MLMI-FLCE technique can be given by the following quadratic concave-convex mathematical optimization equation:

$$\min_{f \in H} \frac{1}{2} \|f\|_H^2 + \sum_{i=1}^{N^1} \lambda_1 V_1(y_i, f(T_i)) + \sum_{i=1}^{N^1} \sum_{l=2}^{L} \lambda_l \tilde{E}(y_i, \max_m \{f(T_{im}^l)\}). \quad (22)$$

5.2 VCD Using SVM-MLMIK Technique With Regularization Framework Employing Constraints A and C (MLMI-ILCC Technique)

This section provides a description of an exemplary embodiment of a VCD technique which combines the SVM-MLMIK technique described heretofore with an embodiment of the regularization framework described heretofore that employs the combination of aforementioned constraint A (which serves to minimize the shot layer instance classification errors) and constraint C (which serves to minimize the inter-layer inconsistency penalty). This particular embodiment of the regularization framework employing constraints A and C is hereafter referred to as the inter-layer consistency constraint (ILCC) approach, and this corresponding particular embodiment of the VCD technique is hereafter referred to as the MLMI-ILCC technique.

Referring again to FIG. 4, the use of constraint C 406 in the regularization framework 400 is motivated by the fact that the key-frame and key-region sub-layer instance classification labels 418/419 should be consistent with the shot layer instance classification labels 417. In this particular embodiment, the loss function for each shot can be given by the equation:

$$V(y_i, f(T_i), \{f(T_{im}^l)\}_{m,l}) = \quad (23)$$
$$\lambda_1 V_1(y_i, f(T_i)) + \sum_{l=2}^{L} \lambda_l V_l(f(T_i), \{f(T_{im}^l)\}_m).$$

The aforementioned conventional Hinge loss function can be used to represent the shot layer classification errors as described in the MLMI-FLCE technique heretofore. The loss function for the inter-layer inconsistency penalty can be given by the equation:

$$V_l(f(T_i), \{f(T_{im}^l)\}_m) = E(f(T_i), \max_m \{f(T_{im}^l)\}). \quad (24)$$

$\lambda_1$ and $\lambda_l$ in equation (23) are prescribed regularization constants which determine a tradeoff between the shot layer instance classification errors and inter-layer inconsistency penalty. Various different loss functions can be employed for V in equation (24), such as a conventional L1 loss function, a conventional L2 loss function, etc. In the technique embodiments described herein, an L1 loss function is employed for V. As is appreciated in the art of kernel-based machine-learning, the L1 loss function is defined by the equation $E_{L1}(a,b) = |a-b|$. As a result, $\tilde{E}{\bullet, \bullet}$ in equation (24) can be given by the equation:

$$E(f(T_i), \max_m\{f(T_{im}^l)\}) = |f(T_i) - \max_m\{f(T_{im}^l)\}|. \quad (25)$$

Thus, the learned objective decision function for the MLMI-ILCC technique can be given by the following quadratic concave-convex mathematical optimization equation:

$$\min_{f\in H} \frac{1}{2}\|f\|_H^2 + \sum_{i=1}^{N^1} \lambda_1 V_1(y_i, f(T_i)) + \sum_{i=1}^{N^1}\sum_{l=2}^{L} \lambda_l E(f(T_i), \max_m\{f(T_{im}^l)\}). \quad (26)$$

5.3 VCD Using SVM-MLMIK Technique With Regularization Framework Employing Constraints A, B and C (MLMI-FLCE-ILCC Technique)

This section provides a description of an exemplary embodiment of a VCD technique which combines the SVM-MLMIK technique described heretofore with an embodiment of the regularization framework described heretofore that employs the combination of constraint A (which serves to minimize the shot layer instance classification errors), constraint B (which serves to minimize the key-frame and key-region sub-layer instance classification errors), and constraint C (which serves to minimize the inter-layer inconsistency penalty). This particular embodiment of the regularization framework employing constraints A, B and C is hereafter referred to as the MLMI-FLCE-ILCC technique.

Based on the descriptions of the MLMI-FLCE and MLMI-ILCC techniques heretofore, the loss function for each shot can be given by the equation:

$$V(y_i, f(T_i), \{f(T_{im}^l)\}_{m,l}) = \lambda_1 V_1(y_i, f(T_i)) + \quad (27)$$

$$\sum_{l=2}^{L} \tilde{\lambda}_l \tilde{V}_l(y_i, \{f(T_{im}^l)\}_m) + \sum_{l=2}^{L} \lambda_l V_l(f(T_i), \{f(T_{im}^l)\}_m).$$

$\lambda_1$, $\tilde{\lambda}_l$ and $\lambda_l$ in equation (27) are prescribed regularization constants which determine a tradeoff between the constraints A, B and C. Using the equations for $V_1$, $\tilde{V}_l$ and $V_l$ provided heretofore, and assuming an L1 loss function is employed for V as described heretofore, the learned objective decision function for the MLMI-FLCE-ILCC technique can be given by the following quadratic concave-convex mathematical optimization equation:

$$\min_{f\in H} \frac{1}{2}\|f\|_H^2 + \sum_{i=1}^{N^1} \lambda_1 V_1(y_i, f(T_i)) + \quad (28)$$

$$\sum_{i=1}^{N^1}\sum_{l=2}^{L} \tilde{\lambda}_l \tilde{E}(y_i, \max_m\{f(T_{im}^l)\}) + \sum_{i=1}^{N^1}\sum_{l=1}^{L} \lambda_l E(f(T_i), \max_m\{f(T_{im}^l)\}).$$

6.0 Optimization Using CCCP

This section generally describes the use of a conventional constrained concave-convex quadratic programming (CCCP) method for practically solving the three different mathematical optimization problems given by equations (22), (26) and (28).

6.1 MLMI-ILCC Technique Using L1 Loss (Constraints A and C)

This section generally describes an embodiment of how the aforementioned conventional CCCP method can be used to practically solve the mathematical optimization problem given by equation (26) for the MLMI-ILCC technique described heretofore. More particularly, by introducing slack variables, equation (26) can be rewritten as the following constrained minimization equation:

$$\min_{f\in H, \delta_1, \delta_l^*, l=2,\ldots,L} \frac{1}{2}\|f\|_H^2 + \lambda_1 \delta_1^T 1 + \sum_{l=2}^{L} \lambda_l(\delta_l^T 1 + \delta_l^{*T} 1) \quad (29)$$

$$\text{s.t.} \begin{cases} 1 - y_i f(T_i) \le \delta_{1i}, & i=1,\ldots,N^1 \\ f(T_i) - \max_{m=1,\ldots,N^l}\{f(T_{im}^l)\} \le \delta_{li}, & i=1,\ldots,N^1, l=2,\ldots L \\ \max_{m=1,\ldots,N^l}\{f(T_{im}^l)\} - f(T_i) \le \delta_{li}^*, & i=1,\ldots,N^1, l=2,\ldots L \\ 0 \le \delta_{1i}, 0 \le \delta_{li}, 0 \le \delta_{li}^*, & i=1,\ldots,N^1, l=2,\ldots L \end{cases}$$

where $\delta_1 = [\delta_{11}, \delta_{12}, \ldots, \delta_{1N^1}]^T$ is a vector of slack variables for the shot layer classification errors, $\delta_l = [\delta_{l1}, \delta_{l2}, \ldots, \delta_{lN^1}]^T$ and $\delta_l^* = [\delta_{l1}^*, \delta_{l2}^*, \ldots, \delta_{lN^1}^*]^T$ are vectors of slack variables for the classification inconsistency between the $l^{th}$ layer and the root/shot layer, and $1 = [1, 1, \ldots, 1]^T$ is a vector of all ones.

Now define f to be a linear function in the mapped high-dimensional space $f(X) = W^T\phi(X) + b$, where $\phi(\bullet)$ is the mapping function. By ignoring b in $\|f\|_H^2$ (as is done in the conventional SVM-SL method described heretofore) and substituting f into equation (29), equation (29) becomes:

$$\min_{W, b, \delta_1, \delta_l^*, l=2,\ldots,L} \frac{1}{2}W^T W + \lambda_1 \delta_1^T 1 + \sum_{l=2}^{L} \lambda_l(\delta_l^T 1 + \delta_l^{*T} 1) \quad (30)$$

$$\text{s.t.} \begin{cases} 1 - y_i(W^T\phi(T_i) + b) \le \delta_{1i}, & i=1,\ldots,N^1 \\ W^T\phi(T_i) - \max_{m=1,\ldots,N^l}\{W^T\phi(T_{im}^l)\} \le \delta_{li}, & i=1,\ldots,N^1, l=2,\ldots L \\ \max_{m=1,\ldots,N^l}\{W^T\phi(T_{im}^l)\} - W^T\phi(T_i) \le \delta_{li}^*, & i=1,\ldots,N^1, l=2,\ldots L \\ 0 \le \delta_{1i}, 0 \le \delta_{li}, 0 \le \delta_{li}^*, & i=1,\ldots,N^1, l=2,\ldots L \end{cases}$$

It is noted that the second and third constraints in equation (30) are non-linear concave-convex inequalities, and all the other constraints are linear. Therefore, the CCCP method is well suited to solving the mathematical optimization problem in equation (30). By employing the following sub-gradient of the max function in equation (30):

$$\partial\left(\max_{m=1,\ldots,N^l}\{W^T\phi(T_{im}^l)\}\right) = \sum_{m=1}^{N^l} \beta_{im}^l \phi(T_{im}^l), \quad (31)$$

where $$\beta_{im}^l = \begin{cases} 0 & \text{if } W^T\phi(T_{im}^l) \neq \max_r\{W^T\phi(T_{ir}^l)\}, \\ 1/R & \text{otherwise} \end{cases} \quad (32)$$

and where R is the number of sub-structures with maximal response, equation (30) can be solved in an iterative fashion by fixing W and β in turn until W converges. More particularly, when fixing W equation (32) is solved, and then when fixing β the following equation is solved:

$$\min_{W,b,\delta_1,\delta_l,\delta_l^*,l=2,\ldots,L} \frac{1}{2} W^T W + \lambda_1 \delta_1^T 1 + \sum_{l=2}^{L} \lambda_l(\delta_l^T 1 + \delta_l^{*T} 1) \quad (33)$$

$$\text{s.t.} \begin{cases} 1 - y_i(W^T\phi(T_i) + b) \leq \delta_{1i}, & i=1,\ldots,N^1 \\ W^T\phi(T_i) - \sum_{m=1}^{N^l} \beta_{im}^l W^T\phi(T_{im}^l) \leq \delta_{li}, & i=1,\ldots,N^1, l=2\ldots L \\ \sum_{m=1}^{N^l} \beta_{im}^l W^T\phi(T_{im}^l) - W^T\phi(T_i) \leq \delta_{li}^*, & i=1,\ldots,N^1, l=2,\ldots L \\ 0 \leq \delta_{1i}, 0 \leq \delta_{li}, 0 \leq \delta_{li}^*, & i=1,\ldots,N^1, l=2,\ldots L \end{cases}$$

However, equation (33) cannot be solved directly since W lies in the mapped feature space which usually goes infinite. In order to address this issue, the explicit usage of W can be removed by forming a dual mathematical optimization problem as follows. Introducing the following Lagrange multiplier coefficients:

$$\alpha = [\alpha_1^1,\ldots,\alpha_{N^1}^1,\alpha_1^2,\ldots,\alpha_{N^1}^2,\alpha_1^{*2},\ldots,$$
$$\alpha_{N^1}^{*2},\ldots,\alpha_1^L,\ldots,\alpha_{N^1}^L,\alpha_1^{*L},\ldots,\alpha_{N^1}^{*L}]^T \quad (34)$$

into the constraints A and C results in the following dual formulation equation according to the conventional Karush-Kuhn-Tucker (KKT) theorem:

$$\min_{\alpha} \frac{1}{2}\alpha^T Q\alpha + p^T\alpha \quad (35)$$

$$\text{s.t.} \begin{cases} Y^T\alpha = 0 \\ 0 \leq \alpha \leq \Lambda \end{cases}$$

and the equality $W = \sum_{i=1}^{N} (A\alpha)_i \times \phi(\mathcal{T}(i))$, where α,p,Y, and Λ are $\mathcal{M}=(2L-1)\times N^1$ dimensional vectors, and p,Y, and Λ have entrances given by the equations:

$$p_i = \begin{cases} -1 & 1 \leq i \leq N^1 \\ 0 & \text{otherwise} \end{cases}, Y_i = \begin{cases} y_i & 1 \leq i \leq N^1 \\ 0 & \text{otherwise} \end{cases}, \quad (36)$$

and $$\Lambda_i = \begin{cases} \lambda_1 & 1 \leq i \leq N^1 \\ \lambda_l & (2l-3)N^1 + 1 \leq i \leq (2l-1)N^1; l=2,\ldots,L \end{cases} \quad (37)$$

In equation (35), $Q=A^T KA$ is the Gram matrix with K being a kernel matrix and A being a sparse matrix of size $\mathcal{M}\times\mathcal{N}$, where $\mathcal{N}=\mathcal{T}$ is the overall number of nodes in the training set, and $\mathcal{M}$ is the dimension of α. Intuitively, A can be regarded as a multi-instance transform matrix that represents the inter-layer inconsistency penalty constraint C to the hyper-plane, where A is given by the equation:

$$A_{IJ} = \quad (38)$$

$$\begin{cases} y_I & I, J \in [1, N^1] \\ -1 & I \in [1, N^1], J \in [(2l-3)N^1+1, (2l-2)N^1]; 2 \leq l \leq L \\ 1 & I \in [1, N^1], J \in [(2l-2)N^1+1, (2l-1)N^1]; 2 \leq l \leq L \\ \beta_I & I \notin [1, N^1], J \in [(2l-3)N^1+1, (2l-2)N^1]; \\ & l \text{ is the layer of node set } \mathcal{L}(I) \\ -\beta_I & I \notin [1, N^1], J \in [(2l-2)N^1+1, (2l-1)N^1]; \\ & l \text{ is the layer of node set } \mathcal{L}(I) \\ 0 & \text{otherwise} \end{cases}$$

where $\beta_I$ is a prescribed coefficient for node set $\mathcal{T}(I)$, and $\beta_I$ corresponds to $\beta_{im}^l$ in equation (31).

Eventually, equation (26) becomes a modified learned objective decision function given by the equation:

$$f(x) = W^T\phi(x) + b \quad (39)$$
$$= \left(\sum_{i=1}^{N} (A\alpha)_i \times \phi(\mathcal{L}(i))\right)^T \phi(x) + b$$
$$= k^T(x)A\alpha + b.$$

Then, in the same manner as described heretofore for the SVM-MLMIK technique, the modified learned objective decision function of equation (39) can be improved by substituting the MLMI kernel of equation (12) for the kernel $k^T(x)$, resulting in an improved modified learned objective decision function f'(x) given by the equation:

$$f'(x) = k_{MLMI}(x_i, x)A\alpha + b. \quad (40)$$

In tested embodiments of the MLMI-ILCC technique $\lambda_1$ was specified to be the set of values $\{2^{-2}, 2^{-1},\ldots, 2^5\}$. Additionally, $\lambda_2 = \lambda_3 = \ldots = \lambda_L$ were specified to be the set of values $\{10^{-3}, 10^{-2}, 10^{-1}, 1\}$.

6.2 MLMI-FLCE Technique Using L1 Loss (Constraints A and B)

This section generally describes an embodiment of how the aforementioned CCCP method can be used to practically solve the mathematical optimization problem given by equation (22) for the MLMI-FLCE technique described heretofore. An approach similar to that for the MLMI-ILCC technique just described is used to solve this optimization problem. More particularly, by introducing slack variables, equation (22) can be rewritten as the following constrained minimization equation:

$$\min_{f\in H, \delta_1, \delta_l, \delta_l^*, l=2,\ldots,L} \frac{1}{2}\|f\|_H^2 + \lambda_1 \delta_1^T 1 + \sum_{l=2}^{L} \lambda_l \delta_l^T 1 \quad (41)$$

$$\text{s.t.} \begin{cases} 1 - y_i^f(T_i) \leq \delta_{1i}, & i=1,\ldots,N^1 \\ -y_i \times \max_{m=1,\ldots,N^l}\{f(T_{im}^l)\} \leq \delta_{li}, & i=1,\ldots,N^1, l=2,\ldots L \\ 0 \leq \delta_{1i}, 0 \leq \delta_{li}, & i=1,\ldots,N^1, l=2,\ldots L \end{cases}$$

where $\delta_1$, $\delta_l$, and $\delta_l^*$ are defined the same as for the MLMI-ILCC technique.

The CCCP method can be employed in the same iterative manner just described in detail above for the MLMI-ILCC technique in order to solve the mathematical optimization problem in an iterative manner and eventually derive an improved modified learned objective decision function for the MLMI-FLCE technique similar to equation (40). However, it is noted that in this case the variables in equation (35) differ as follows compared to the definitions provided for the MLMI-ILCC technique. $\alpha, p, Y,$ and $\Lambda$ are $\mathcal{M} = L \times N^1$ dimensional vectors with entrances given by the equations:

$$\alpha = [\alpha_1^1, \ldots, \alpha_{N^1}^1, \alpha_1^2, \ldots, \alpha_{N^1}^2, \ldots, \alpha_1^L, \ldots, \alpha_{N^1}^L]^T, \quad (42)$$

$$p_i = \begin{cases} -1 & 1 \leq i \leq N^1 \\ 0 & \text{otherwise} \end{cases}, Y_i = y_{j\%N^1}, \quad (43)$$

$$\Lambda_i = \begin{cases} \lambda_1 & 1 \leq i \leq N^1 \\ \lambda_l & (l-1)\times N^1 + 1 \leq i \leq l\times N^1; l=2,\ldots,L \end{cases}, \quad (44)$$

and A is a multi-instance transform matrix given by the equation:

$$A_{IJ} = \begin{cases} y_I & I = J \in [1, N^1] \\ y_{J\%N^1} \times \beta_l & I \notin [1, N^1], J \in [(l-1)\times N^1 + 1, l\times N^1]; \\ & l \text{ is the layer of node set } \mathcal{L}(I). \\ 0 & \text{otherwise} \end{cases} \quad (45)$$

In tested embodiments of the MLMI-FLCE technique, σ was specified to vary from 1 to 15 with a step size of 2, and $\lambda_1$ was specified to be the set of values $\{2^{-2}, 2^{-1}, \ldots 2^5\}$. Additionally, $\lambda_2 = \lambda_3 = \ldots = \lambda_L$ were specified to be the set of values $\{10^{-3}, 10^{-2}, 10^{-1}, 1\}$.

6.3 MLMI-FLCE-ILCC Technique Using L1 Loss (Constraints A, B and C)

This section generally describes an embodiment of how the aforementioned CCCP method can be used to practically solve the mathematical optimization problem given by equation (28) for the MLMI-FLCE-ILCC technique described heretofore. An approach similar to that for the MLMI-ILCC technique described heretofore is used to solve this optimization problem. More particularly, by introducing slack variables, equation (28) can be rewritten as the following constrained minimization equation:

$$\min_{f\in H, \delta_1, \delta_l, \delta_l^*, l=2,\ldots,L} \frac{1}{2}\|f\|_H^2 + \lambda_1 \delta_1^T 1 + \sum_{l=2}^{L} \tilde{\lambda}_l \tilde{\delta}_l^T 1 + \sum_{l=2}^{L} \lambda_l (\delta_l^T 1 + \delta_l^{*T} 1) \quad (46)$$

$$\text{s.t.} \begin{cases} 1 - y_i f(T_i) \leq \delta_{1i}, & i=1,\ldots,N^1 \\ -y_i \times \max_{m=1,\ldots,N^l}\{f(T_{im}^l)\} \leq \tilde{\delta}_{li}, & i=1,\ldots,N^1, l=2,\ldots L \\ f(T_i) - \max_{m=1,\ldots,N^l}\{f(T_{im}^l)\} \leq \delta_{li}, & i=1,\ldots,N^1, l=2,\ldots L \\ \max_{m=1,\ldots,N^l}\{f(T_{im}^l)\} - f(T_i) \leq \delta_{li}^*, & i=1,\ldots,N^1, l=2,\ldots L \\ 0 \leq \delta_{1i}, 0 \leq \tilde{\delta}_{li}, 0 \leq \delta_{li}, 0 \leq \delta_{li}^*, & i=1,\ldots,N^1, l=2,\ldots L \end{cases}$$

where $\delta_1$, $\delta_l$, and $\delta_l^*$ are defined the same as for the MLMI-ILCC technique.

The CCCP method can be employed in the same iterative manner described in detail heretofore for the MLMI-ILCC technique in order to solve the mathematical optimization problem in an iterative manner and eventually derive an improved modified learned objective decision function for the MLMI-FLCE-ILCC technique similar to equation (40). However, it is noted that in this case the variables in equation (35) differ as follows compared to the definitions provided for the MLMI-ILCC technique. $\alpha, p, Y,$ and $\Lambda$ are $\mathcal{M} = (3L-2) \times N^1$ dimensional vectors with entrances given by the equations:

$$\alpha = [\alpha_1^1, \ldots, \alpha_{N^1}^1, \tilde{\alpha}_1^2, \ldots, \tilde{\alpha}_{N^1}^2, \quad (47)$$
$$\ldots, \alpha_1^2, \ldots, \alpha_{N^1}^{*2}, \alpha_1^{*2}, \ldots, \tilde{\alpha}_{N^1}^{*2}, \ldots,$$
$$\tilde{\alpha}_1^L, \ldots, \tilde{\alpha}_{N^1}^L, \alpha_1^L, \ldots, \alpha_{N^1}^L, \alpha_1^{*L}, \ldots, \alpha_{N^1}^{*L}]$$

$$p_i = \begin{cases} -1 & 1 \leq i \leq N^1 \\ 0 & \text{otherwise} \end{cases}, Y_i = \begin{cases} y_i & 1 \leq i \leq N^1 \\ y_{i\%N^1} & N^1 + 1 \leq i \leq L\times N^1 \\ 0 & \text{otherwise} \end{cases}, \quad (48)$$

$$\Lambda_i = \begin{cases} \lambda_1 & 1 \leq i \leq N^1 \\ \tilde{\lambda}_l & (3l-5)N^1 + 1 \leq i \leq (3l-4)N^1; l=2,\ldots,L \\ \lambda_l & (3l-4)N^1 + 1 \leq i \leq (3l-2)N^1; l=2,\ldots,L \end{cases} \quad (49)$$

and A is a multi-instance transform matrix given by the equation:

$$A_{IJ} = \begin{cases} y_T & I, J \in [1, N^1] \\ -1 & I \in [1, N^1], J \in [(3l-4)N^1+1, (3l-3)N^1]; 2 \leq l \leq L \\ 1 & I \in [1, N^1], J \in [(3l-3)N^1+1, (3l-2)N^1]; 2 \leq l \leq L \\ y_{J\%N^1} \times \beta_l & \begin{array}{l} I \notin [1, N^1], J \in [(3l-5)N^1+1, (3l-4)N^1]; \\ l \text{ is the layer of node set } \mathcal{L}(I). \end{array} \\ \beta_l & \begin{array}{l} I \notin [1, N^1], J \in [(3l-4)N^1+1, (3l-3)N^1]; \\ l \text{ is the layer of node set } \mathcal{L}(I) \end{array} \\ -\beta_l & \begin{array}{l} I \notin [1, N^1], J \in [(3l-3)N^1+1, (3l-2)N^1]; \\ l \text{ is the layer of node set } \mathcal{L}(I) \end{array} \\ 0 & \text{otherwise} \end{cases} \quad (50)$$

In tested embodiments of the MLMI-FLCE-ILCC technique, $\sigma$ was specified to vary from 1 to 15 with a step size of 2, and $\lambda_1$ was specified to be the set of values $\{2^{-2}, 2^{-1}, \ldots 2^5\}$. Additionally, $\lambda_2 = \lambda_3 = \ldots = \lambda_L, \tilde{\lambda}_2 = \tilde{\lambda}_3 = \ldots \tilde{\lambda}_L$ were specified to be the set of values $\{10^{-3}, 10^{-2}, 10^{-1}, 1\}$.

6.4 VCD Process Using Regularization Framework

Figure 6:
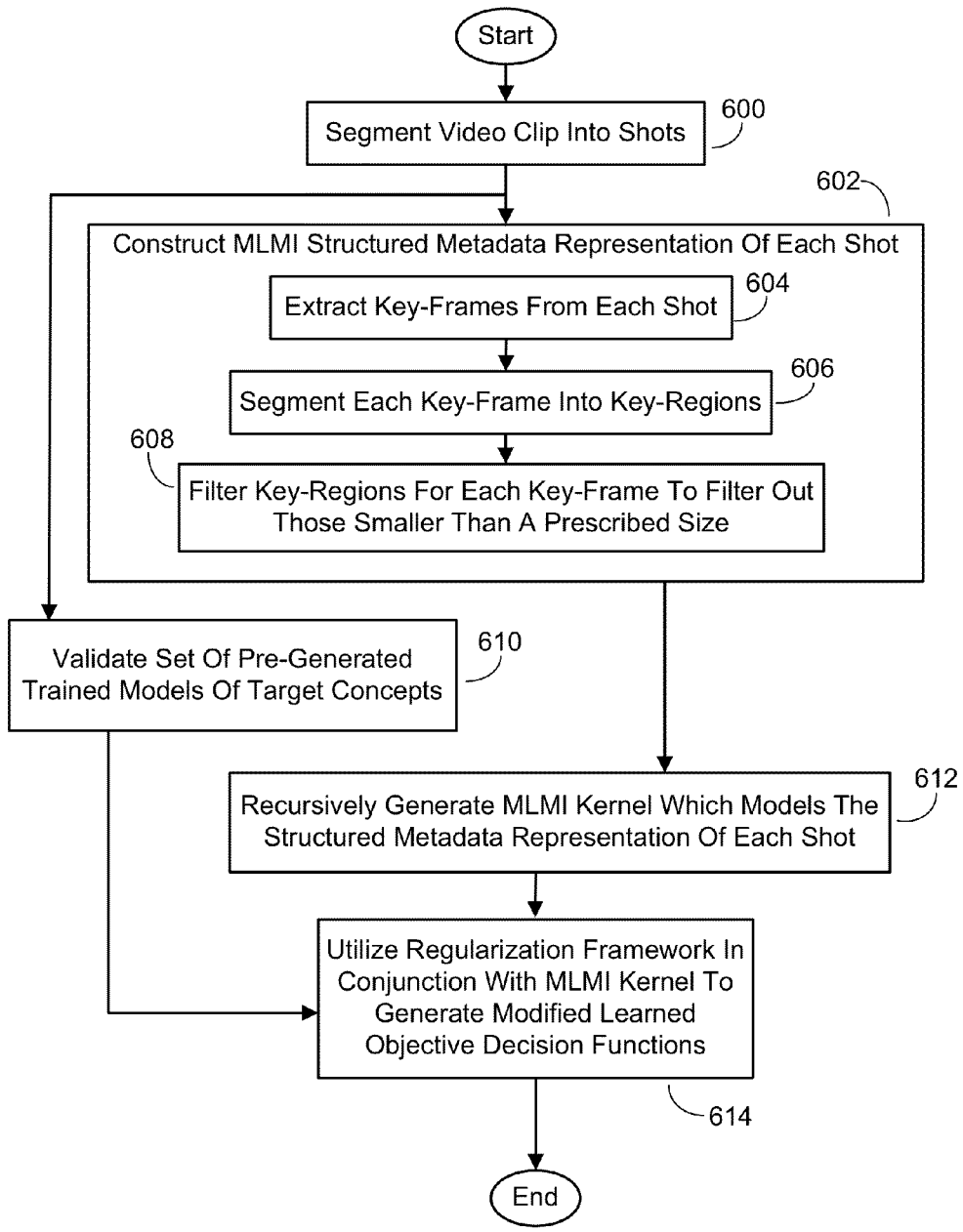
FIG. 6 illustrates an exemplary embodiment, in simplified form, of another process for classifying visual concepts contained within a video clip.

FIG. 6 illustrates an exemplary embodiment, in simplified form, of a regularization framework-based process for performing VCD on a video clip (herein also termed classifying visual concepts contained within the clip) based upon a prescribed set of target concepts. As depicted in FIG. 6, the process starts with segmenting the clip into a plurality of shots 600. An MLMI structured metadata representation of each shot is then constructed 602. This representation includes a hierarchy of three layers. An uppermost shot layer contains the plurality of shots. An intermediate key-frame sub-layer is located contiguously beneath the shot layer and contains one or more key-frames that have been extracted from each shot 604. A lowermost key-region sub-layer is located contiguously beneath the key-frame sub-layer and contains a set of filtered key-regions for each key-frame 606/608. A set of pre-generated trained models of the target concepts is validated 610 using a set of training shots which are selected from the plurality of shots. An MLMI kernel is recursively generated 612, where this kernel models the MLMI structured metadata representation of each shot by comparing prescribed pairs of shots. A regularization framework is then utilized in conjunction with the MLMI kernel to generate modified learned objective decision functions 614 corresponding to either the MLMI-ILCC, MLMI-FLCE or MLMI-FLCE-ILCC techniques, where this decision function learns a classifier for determining if a particular shot, that is not in the set of training shots, contains instances of the target concepts.

7.0 Computing Environment

This section provides a brief, general description of a suitable computing system environment in which portions of the VCD technique embodiments described herein can be implemented. These VCD technique embodiments are operational with numerous general purpose or special purpose computing system environments or configurations. Exemplary well known computing systems, environments, and/or configurations that can be suitable include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the aforementioned systems or devices, and the like.

Figure 7:
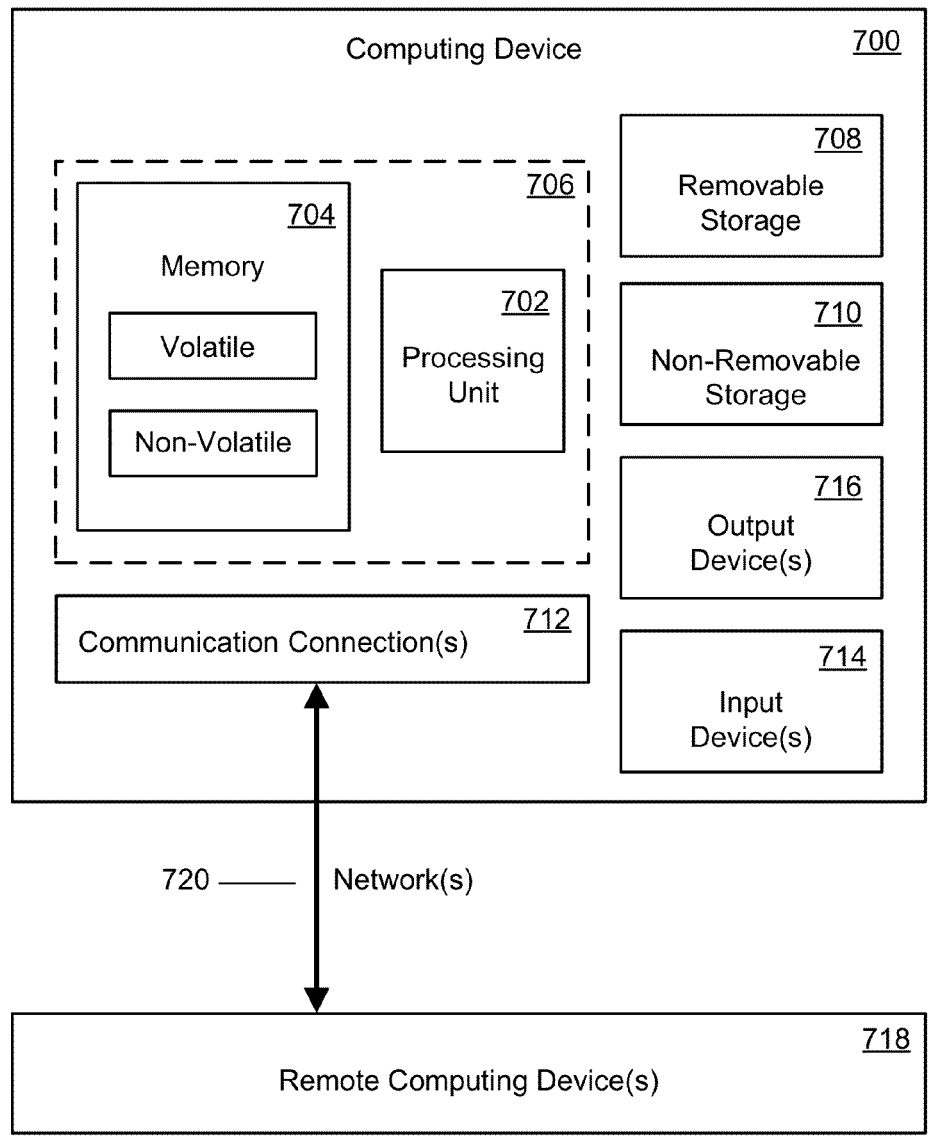
FIG. 7 illustrates a diagram of an exemplary embodiment, in simplified form, of a general purpose, network-based computing device which constitutes an exemplary system for implementing the video concept detection (VCD) technique embodiments described herein.

FIG. 7 illustrates a diagram of an exemplary embodiment, in simplified form, of a suitable computing system environment according to the VCD technique embodiments described herein. The environment illustrated in FIG. 7 is only one example of a suitable computing system environment and is not intended to suggest any limitation as to the scope of use or functionality of the VCD technique embodiments described herein. Neither should the computing system environment be interpreted as having any dependency or requirement relating to any one or combination of components exemplified in FIG. 7.

As illustrated in FIG. 7, an exemplary system for implementing the VCD technique embodiments described herein includes one or more computing devices, such as computing device 700. In its simplest configuration, computing device 700 typically includes at least one processing unit 702 and memory 704. Depending on the specific configuration and type of computing device, the memory 704 can be volatile (such as RAM), non-volatile (such as ROM and flash memory, among others) or some combination of the two. This simplest configuration is illustrated by dashed line 706.

As exemplified in FIG. 7, computing device 700 can also have additional features and functionality. By way of example, computing device 700 can include additional storage such as removable storage 708 and/or non-removable storage 710. This additional storage includes, but is not limited to, magnetic disks, optical disks and tape. Computer storage media typically embodies volatile and non-volatile media, as well as removable and non-removable media implemented in any method or technology. The computer storage media provides for storage of various information required to operate the device 700 such as computer readable instructions associated with an operating system, application programs and other program modules, and data structures, among other things. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical disk storage technology, magnetic cassettes, magnetic tape, magnetic disk storage or other magnetic storage devices, or any other medium which can be used to store the desired information and which can be accessed by computing device 700. Any such computer storage media can be part of computing device 700.

As exemplified in FIG. 6, computing device 700 also includes a communications connection(s) 712 that allows the device to operate in a networked environment and communicate with a remote computing device(s), such as remote computing device(s) 718. Remote computing device(s) 718 can be a PC, a server, a router, a peer device, or other common network node, and typically includes many or all of the elements described herein relative to computing device 700.

Communication between computing devices takes place over a network(s) 720, which provides a logical connection(s) between the computing devices. The logical connection(s) can include one or more different types of networks including, but not limited to, a local area network(s) (LAN) and wide area network(s) (WAN). Such networking environments are commonplace in conventional offices, enterprise-wide computer networks, intranets and the Internet. It will be appreciated that the communications connection(s) 712 and related network(s) 720 described herein are exemplary and other means of establishing communication between the computing devices can be used.

As exemplified in FIG. 7, communications connection(s) 712 and related network(s) 720 are an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, radio frequency (RF), infrared, frequency modulation (FM) radio and other wireless media. The term "computer-readable medium" as used herein includes both the aforementioned storage media and communication media.

As exemplified in FIG. 7, computing device 700 also includes an input device(s) 714 and output device(s) 716. Exemplary input devices 714 include, but are not limited to, a keyboard, mouse, pen, touch input device, microphone, and camera, among others. A user can enter commands and various types of information into the computing device 700 through the input device(s) 714. Exemplary output devices 716 include, but are not limited to, a display device(s), a printer, and audio output devices, among others. These input and output devices are well known and need not be described at length here.

The VCD technique embodiments described herein can be further described in the general context of computer-executable instructions, such as program modules, which are executed by computing device 700. Generally, program modules include routines, programs, objects, components, and data structures, among other things, that perform particular tasks or implement particular abstract data types. The VCD technique embodiments can also be practiced in a distributed computing environment where tasks are performed by one or more remote computing devices 718 that are linked through a communications network 712/720. In a distributed computing environment, program modules can be located in both local and remote computer storage media including, but not limited to, memory 704 and storage devices 708/710.

8.0 Additional Embodiments

While the VCD technique has been described in detail by specific reference to embodiments thereof, it is understood that variations and modifications thereof can be made without departing from the true spirit and scope of the technique. It is also noted that any or all of the aforementioned embodiments can be used in any combination desired to form additional hybrid embodiments. Although the VCD technique embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

Wherefore, what is claimed is:

1. A computer-implemented process for performing video concept detection on a video clip based upon a prescribed set of target concepts, comprising:
using a computer to perform the following process actions:
segmenting the clip into a plurality of shots, wherein each shot comprises a series of consecutive frames that represent a distinctive coherent visual theme;
constructing a multi-layer multi-instance (MLMI) structured metadata representation of each shot, comprising,
a layer indicator l,
a hierarchy of three layers, said hierarchy comprising,
an uppermost shot layer, l=1, comprising the plurality of shots segmented from the clip,
an intermediate key-frame sub-layer, l=2, contiguously beneath the shot layer, comprising one or more key-frames for each shot, wherein each key-frame comprises one or more of the target concepts, and
a lowermost key-region sub-layer, l=3, contiguously beneath the key-frame sub-layer, comprising a set of filtered key-regions for each key-frame, wherein each filtered key-region comprises a particular target concept, and
a rooted tree structure, comprising a connected acyclic directed graph of nodes, wherein each node comprises structured metadata of a certain granularity describing a particular visual concept, and the granularity of the metadata increases for each successive layer down the hierarchy;
validating a set of pre-generated trained models of the target concepts using a set of training shots selected from the plurality of shots;
recursively generating an MLMI kernel $k_{MLMI}(\ )$ which models the MLMI structured metadata representation of each shot by comparing prescribed pairs of shots;
utilizing a regularization framework in conjunction with $k_{MLMI}(\ )$ to generate a modified learned objective decision function f( ) which learns a classifier for determining if a particular shot x, that is not in the set of training shots, comprises instances of the target concepts, wherein the regularization framework introduces explicit constraints which serve to restrict instance classification in the key-frame and key-region sub-layers, thus maximizing the precision of the classifier, wherein the explicit constraints introduced by the regularization framework comprise,
a constraint A comprising a ground truth for the target concepts and instance classification labels for the plurality of shots in the shot layer, said constraint A serving to minimize instance classification errors for said shots, and
a constraint B comprising the ground truth, instance classification labels for the key-frames in the key-frame sub-layer, and instance classification labels for the sets of filtered key-regions in the key-region sub-layer, said constraint B serving to minimize instance classification errors for said key-frames and said filtered key-regions.

2. The process of claim 1, wherein,
given a set of structured metadata comprising a set of training shots $x_i$ and related instance classification labels $y_i$ to the target concepts for $x_i$, wherein,
$x_i$ and $y_i$ are given by the equation $\{(x_i, y_i)\}_{i=1}^{N^1}$, and $N^1$ is the total number of training shots $x_i$, and the set of training shots x, comprises a set I of sequentially indexed nodes given by the equation $$I: \left\{ x_1, \ldots, x_{N^1}, x_{11}^2, \ldots, x_{N^1 N_{N^1}^1}^2, x_{11}^3, \ldots, x_{N^1 N_{N^1}^3}^3 \right\},$$

wherein $x_{im}^l$ is an $m^{th}$ sub-structure in the $l^{th}$ layer for shot $x_i$, and $N_i^l$ is the number of sub-structures in the $l^{th}$ layer for shot $x_i$, the modified learned objective decision function f( ) for the particular shot x is given by the equation $f(x)=k_{MLMI}(x_i, x)A\alpha+b$, wherein, $\alpha$ is a vector of prescribed Lagrange multiplier coefficients given by the equation $\alpha=[\alpha_1^1, \ldots, \alpha_{N^1}^1, \alpha_1^2, \ldots, \alpha_{N^1}^2, \alpha_1^3, \ldots, \alpha_{N^1}^3]^T$, $k_{MLMI}(x_i,x)$ is the MLMI kernel which compares the training shots $x_i$ to x, A is a multi-instance transform matrix given by the equation $$A_{IJ} = \begin{cases} y_I & I = J \in [1, N^1] \\ y_{J \% N^1} \times \beta_l & I \notin [1, N^1], J \in [(I-1) \times N^1 + 1, l \times N^1]; \\ & l \text{ is the layer of node set } I(I), \\ 0 & \text{otherwise} \end{cases}$$

$\beta_l$ is a prescribed coefficient for node set I (I) on layer l, and b is a prescribed bias coefficient.

3. A computer-implemented process for performing video concept detection on a video clip based upon a prescribed set of target concepts, comprising:

using a computer to perform the following process actions:

segmenting the clip into a plurality of shots, wherein each shot comprises a series of consecutive frames that represent a distinctive coherent visual theme;

constructing a multi-layer multi-instance (MLMI) structured metadata representation of each shot, comprising, a layer indicator l, a hierarchy of three layers, said hierarchy comprising, an uppermost shot layer, l=1, comprising the plurality of shots segmented from the clip, an intermediate key-frame sub-layer, l=2, contiguously beneath the shot layer, comprising one or more key-frames for each shot, wherein each key-frame comprises one or more of the target concepts, and a lowermost key-region sub-layer, l=3, contiguously beneath the key-frame sub-layer, comprising a set of filtered key-regions for each key-frame, wherein each filtered key-region comprises a particular target concept, and a rooted tree structure, comprising a connected acyclic directed graph of nodes, wherein each node comprises structured metadata of a certain granularity describing a particular visual concept, and the granularity of the metadata increases for each successive layer down the hierarchy;

validating a set of pre-generated trained models of the target concepts using a set of training shots selected from the plurality of shots;

recursively generating an MLMI kernel $k_{MLMI}($ ) which models the MLMI structured metadata representation of each shot by comparing prescribed pairs of shots;

utilizing a regularization framework in conjunction with $k_{MLMI}($ ) to generate a modified learned objective decision function f( ) which learns a classifier for determining if a particular shot x, that is not in the set of training shots, comprises instances of the target concepts, wherein the regularization framework introduces explicit constraints which serve to restrict instance classification in the key-frame and key-region sub-layers, thus maximizing the precision of the classifier, wherein the explicit constraints introduced by the regularization framework comprise, a constraint A comprising a ground truth for the target concepts and instance classification labels for the plurality of shots in the shot layer, said constraint A serving to minimize instance classification errors for said shots, a constraint B comprising the ground truth, instance classification labels for the key-frames in the key-frame sub-layer, and instance classification labels for the sets of filtered key-regions in the key-region sub-layer, said constraint B serving to minimize instance classification errors for said key-frames and said filtered key-regions, and a constraint C comprising the instance classification labels for the plurality of shots in the shot layer, the instance classification labels for the key-frames in the key-frame sub-layer, and the instance classification labels for the sets of filtered key-regions in the key-region sub-layer, said constraint C serving to minimize an inter-layer inconsistency penalty which measures consistency between the instance classification labels for the plurality of shots, the instance classification labels for the key-frames and the instance classification labels for the sets of filtered key-regions.

4. The process of claim 3, wherein, given a set of structured metadata comprising a set of training shots $x_i$ and related instance classification labels y, to the target concepts for $x_i$, wherein, $x_i$ and $y_i$ are given by the equation $\{(x_i,y_i)_{i=1}^{N^1}\}$, and $N^1$ is the total number of training shots $x_i$, and the set of training shots $x_i$ comprises a set I of sequentially indexed nodes given by the equation $$I: \left\{ x_1, \ldots, x_{N^1}, x_{11}^2, \ldots, x_{N^1 N_{N^1}^1}^2, x_{11}^3, \ldots, x_{N^1 N_{N^1}^3}^3 \right\},$$

wherein $x_{im}^l$ is an $m^{th}$ sub-structure in the $l^{th}$ layer for shot $x_i$, and $N_i^l$ is the number of sub-structures in the $l^{th}$ layer for shot $x_i$, the modified learned objective decision function f( ) for the particular shot x is given by the equation $f(x)=k_{MLMI}(x_i, x)A\alpha+b$, wherein, $\alpha$ is a vector of prescribed Lagrange multiplier coefficients given by the equation $\alpha=[\alpha_1^1, \ldots, \alpha_{N^1}^1, \alpha_1^2, \ldots, \alpha_{N^1}^2, \alpha_1^3, \ldots, \alpha_{N^1}^3]^T$, $k_{MLMI}(x_i,x)$ is the MLMI kernel which compares the training shots $x_i$ to x, A is a multi-instance transform matrix given by the equation $$A_{IJ} = \begin{cases} y_I & I, J \in [1, N^1] \\ -1 & I \in [1, N^1], J \in [(2l-3)N^1 + 1, (2l-2)N^1]; 2 \le l \le 3 \\ 1 & I \in [1, N^1], J \in [(2l-2)N^1 + 1, (2l-1)N^1]; 2 \le l \le 3 \\ \beta_l & \begin{array}{l} I \notin [1, N^1], J \in [(2l-3)N^1 + 1, (2l-2)N^1]; \\ l \text{ is the layer of node set } I(I) \end{array} \\ -\beta_l & \begin{array}{l} I \notin [1, N^1], J \in [(2l-2)N^1 + 1, (2l-1)N^1]; \\ l \text{ is the layer of node set } I(I) \end{array} \\ 0 & \text{otherwise} \end{cases},$$

$\beta_I$ is a prescribed coefficient for node set I (I) on layer l, and b is a prescribed bias coefficient.

5. The process of claim 4, wherein, constraint A is a Hinge loss function which measures disagreement between the instance classification labels $y_i$ and classification of the shots $x_i$ in the shot layer, constraint B is a Hinge loss function which measures disagreement between the instance classification labels $y_i$ classification of the shots $x_i$ in the key-frame sub-layer and the key-region sub-layer, and constraint C is an inter-layer inconsistency loss function which measures disagreement between classification of the shots $x_i$ in the shot layer, the key-frame sub-layer and the key-region sub-layer, wherein, an L1 loss function is employed for constraints A, B and C.

\* \* \* \* \*